United States Patent
Wang

(10) Patent No.: US 11,570,212 B2
(45) Date of Patent: Jan. 31, 2023

(54) METHOD AND APPARATUS FOR DEFENDING AGAINST NETWORK ATTACK

(71) Applicant: HUAWEI TECHNOLOGIES CO., LTD., Shenzhen (CN)

(72) Inventor: Yuchen Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 17/026,202

(22) Filed: Sep. 19, 2020

(65) Prior Publication Data

US 2021/0006594 A1 Jan. 7, 2021

Related U.S. Application Data

(63) Continuation of application No. PCT/CN2019/078391, filed on Mar. 16, 2019.

(30) Foreign Application Priority Data

Mar. 19, 2018 (CN) .......................... 201810226068.X

(51) Int. Cl.
*H04L 9/40* (2022.01)
*H04L 43/10* (2022.01)
*H04L 45/00* (2022.01)

(52) U.S. Cl.
CPC .......... *H04L 63/1491* (2013.01); *H04L 43/10* (2013.01); *H04L 45/20* (2013.01);
(Continued)

(58) Field of Classification Search
CPC ..... H04L 63/1491; H04L 43/10; H04L 45/20; H04L 63/0236; H04L 63/0263;
(Continued)

(56) References Cited

U.S. PATENT DOCUMENTS

| 8,955,128 B1 * | 2/2015 | Trama ..................... H04L 63/02 726/23 |
| 9,578,055 B1 | 2/2017 | Khanal |

(Continued)

FOREIGN PATENT DOCUMENTS

| CN | 101087196 A | 12/2007 |
| CN | 101567887 A | 10/2009 |

(Continued)

*Primary Examiner* — Cheng-Feng Huang
(74) *Attorney, Agent, or Firm* — Rimon PC

(57) ABSTRACT

This application discloses a method and an apparatus for defending against a network attack, to resolve a problem that network defense costs are relatively high. The method includes: a network security device receives a first packet sent by an external device, and matches a destination IP address of the first packet with configuration information of a fake network. If an IP address of a node in the configuration information of the fake network has a same subnet prefix as the destination IP address, the network security device processes the first packet based on a fake network policy; if no IP address of a node in the configuration information of the fake network has a same subnet prefix as the destination IP address, the network security device processes the first packet based on a firewall policy.

20 Claims, 11 Drawing Sheets

(52) U.S. Cl.
CPC .......... *H04L 63/02* (2013.01); *H04L 63/0236* (2013.01); *H04L 63/0263* (2013.01); *H04L 63/1416* (2013.01); *H04L 63/1441* (2013.01); *H04L 63/20* (2013.01); *H04L 63/1483* (2013.01)

(58) Field of Classification Search
CPC ..... H04L 63/20; H04L 63/02; H04L 63/1416; H04L 63/1441; H04L 63/1483
See application file for complete search history.

(56) References Cited

U.S. PATENT DOCUMENTS

| | | | |
|---|---|---|---|
| 9,716,727 B1* | 7/2017 | Seger | .................. H04L 63/1491 |
| 2005/0033985 A1* | 2/2005 | Xu | ........................ H04L 63/029 726/4 |
| 2009/0328216 A1* | 12/2009 | Rafalovich | ......... H04L 63/1441 726/23 |
| 2017/0331858 A1 | 11/2017 | Clark, III et al. | |

FOREIGN PATENT DOCUMENTS

| | | | |
|---|---|---|---|
| CN | 101582907 | A | 11/2009 |
| CN | 101873556 | B | 5/2013 |
| CN | 103561004 | A | 2/2014 |
| CN | 103607399 | A | 2/2014 |
| CN | 105721442 | A | 6/2016 |
| CN | 106961442 | A | 7/2017 |
| CN | 106970939 | A | 7/2017 |
| CN | 104506507 | B | 10/2017 |
| CN | 107360182 | A | 11/2017 |
| CN | 107563197 | A | 1/2018 |
| CN | 107682342 | A | 2/2018 |
| WO | 02098100 | A1 | 12/2002 |
| WO | 2006107712 | A2 | 10/2006 |

* cited by examiner

METHOD AND APPARATUS FOR DEFENDING AGAINST NETWORK ATTACK

CROSS-REFERENCE TO RELATED APPLICATIONS

This application is a continuation of International Application No. PCT/CN2019/078391, filed on Mar. 16, 2019, which claims priority to Chinese Patent Application No. 201810226068.X, filed on Mar. 19, 2018. The disclosures of the aforementioned applications are hereby incorporated by reference in their entireties.

TECHNICAL FIELD

This application relates to the field of network technologies, and in particular, to a method and an apparatus for defending against a network attack.

BACKGROUND

With development of Internet technologies, network scanning, spread of worms and virus code, a malicious attack by a hacker, and the like are dangers that every host on a network may face at any time. It is expected that a current network security defense technology can prevent an attack activity before an attack damage occurs, so that a virtual execution-based detection technology such as a honeypot and a honeynet is needed. In current mainstream practices, some honeypots are deployed as bait in a network system to lure an attacker to attack the worms and virus code. In this way, an attack behavior may be captured and analyzed, a tool and method used by the attacker are learned of, and attack intent and motivation are speculated. Therefore, a defender can clearly understand a security threat that the defender faces and enhances a security protection capability of a protected system through a technologies and management. A honeypot is a computer system operated on the Internet. The honeypot simulates as a real network, a host, a service, or the like that is vulnerable to an attack, and acts as bait to lure a malicious attack. The value of the honeypot lies in collecting attack activity information on a network, and monitoring, detecting and analyzing the information. A honeynet is an overall network system architecture for trapping these attack activities. One honeynet system generally includes one or more honeypots. An objective of a honeynet system is to collect attack information of an intruder. Therefore, how to lure an attacker to attack a honeynet is an important part of a honeynet system.

To perform an all-round security defense for a network system, a large number of honeypots need to be deployed in a network system. However, deployment of honeypots needs relatively high costs, causing relatively high costs of a network defense.

SUMMARY

This application provides a method and an apparatus for defending against a network attack, to resolve a problem of relatively high costs of a network defense in the prior art.

According to a first aspect, this application provides a method for defending against a network attack, and the method includes: a network security device receives a first packet sent by an external device, and matches a destination internet protocol (IP) address of the first packet with configuration information of the fake network. If an IP address of a node in the configuration information of the fake network has a same subnet prefix as the destination IP address, the network security device processes the first packet based on a fake network policy; if no IP address of a node in the configuration information of the fake network has a same subnet prefix as the destination IP address, the network security device processes the first packet based on a firewall policy. The network security device is deployed between a protected network and an external network in which the external device is located. The network security device stores the configuration information of the fake network. The configuration information includes an internet protocol IP address of each node in the fake network. Each fake network policy includes a matching condition and an action corresponding to the matching condition. The action includes constructing and sending a response packet, or prohibiting answering the first packet, or redirecting the first packet to a honeypot device. In the foregoing design, the network security device matches the received packet with the configuration information of the fake network, and responds to or does not answer the received packet based on a fake network policy, to present fake network topology to an attacker. In this case, the attacker mistakenly considers that each node in the fake network really exists in the protected network, and cannot simply distinguish real nodes from fake nodes through scanning. Compared with a method of deploying a large quantity of honeypots in the prior art, in the embodiments of this application, a gateway device presents fake network topology to the attacker by using an existing packet matching technology, so that a probability that a real system is attacked for the first time can be reduced. In addition, in this method, the attacker needs to pay more costs for data analysis to determine a real node and a fake node, so that an attack activity of the attacker can be interfered and misled at relatively low costs.

In a possible design, the processing, by the network security device, the first packet based on a fake network policy includes: the network security device determines matching information of the first packet, separately matches the matching information of the first packet with a matching condition included in at least one fake network policy, selects a fake network policy matching the first packet, where the matching information of the first packet meets a matching condition in the selected fake network policy, and then performs the action in the selected fake network policy. The matching information includes at least one or more of the following: a protocol type of the first packet, the destination IP address of the first packet, and a destination port number of the first packet. In the foregoing design, the network security device may match, by using an existing packet matching technology, the matching information of the first packet with the matching condition included in the at least one fake network policy, to select the fake network policy, and responds to or does not answer the received packet. In this case, the attacker mistakenly considers that each node in the fake network really exists in the protected network, so that the probability that the real system is attacked for the first time is reduced, and an attack activity of the attacker can be interfered and misled at relatively low costs.

In a possible design, the matching condition in the selected fake network policy is: a protocol type is the internet control message protocol (ICMP), and a destination IP address is an IP address of a first node in the fake network; and the action in the selected fake network policy is: constructing and sending a response packet, or redirecting the first packet to the honeypot device, where the response packet is used to indicate that the destination IP address is reachable. An ICMP packet is a packet used to detect whether an IP is reachable. In the foregoing design, when the first packet is the ICMP packet, and the destination IP address of the first packet is the IP address of the first node in the fake network, the network security device responds, to the external device by using an existing packet matching technology, a packet used to indicate that the destination IP address is reachable. In this case, the attacker mistakenly considers that the first node really exists in the protected network, so that an attack activity of the attacker can be interfered and misled at relatively low costs. Alternatively, the network security device redirects the first packet to the honeypot device, so that the first packet may be analyzed and detected by the honeypot device, and a network security defense may be implemented by deploying a small quantity of honeypot devices, thereby reducing costs of the network security defense.

In a possible design, the configuration information further includes a topological relationship between nodes in the fake network, and the response packet carries a time to live, where the time to live is determined by the network security device based on the topological relationship, and the time to live indicates a quantity of routing nodes through which a packet passes in a process of transmitting the packet to the first node. In the foregoing design, the network security device notifies the attacker of a quantity of route forwarding times before a packet reaches the first node, to present fake network topology to the attacker, so that the attacker activity can be interfered or misled at relatively low costs.

In a possible design, the matching condition in the selected fake network policy is: a protocol type is the ICMP, and a destination IP address is not an IP address of any node in the fake network; and the action in the selected fake network policy is: constructing and sending a response packet, or redirecting the first packet to the honeypot device, where the response packet is used to indicate that the destination IP address is unreachable, and an IP address of a gateway device corresponding to a subnet prefix of the destination IP address is reachable. In the foregoing design, when the first packet is the ICMP packet, and the destination IP address of the first packet is not the IP address of any node in the fake network, the network security device responds, to the external device by using an existing packet matching technology, a packet used to indicate that the destination IP address is unreachable, and the IP address of the gateway device corresponding to the subnet prefix of the destination IP address is reachable. In this case, the attacker mistakenly considers that the network device corresponding to the destination IP address does not exist in the protected network, but the gateway device corresponding to the subnet prefix of the destination IP address really exists, so that an attack activity of the attacker can be interfered and misled at relatively low costs. Alternatively, the network security device redirects the first packet to the honeypot device, so that the first packet may be analyzed and detected by the honeypot device, and a network security defense may be implemented by deploying a small quantity of honeypot devices, thereby reducing costs of the network security defense.

In a possible design, the configuration information further includes a topological relationship between nodes in the fake network, the response packet carries a time to live, the time to live is determined by the network security device based on the topological relationship, and the time to live indicates a quantity of route forwarding times before a packet reaches the gateway device corresponding to the subnet prefix of the destination IP address. In the foregoing design, the network security device notifies the attacker of a quantity of routing nodes through which a packet passes in a process of transmitting the packet to the gateway device corresponding to the subnet prefix of the destination IP address, to present fake network topology to the attacker, so that the attacker activity can be interfered or misled at relatively low costs.

In a possible design, the matching condition in the selected fake network policy is: a protocol type is the transmission control protocol (TCP), and a destination port is a first port in the fake network, where the destination port is determined based on the destination IP address and the destination port number; and the action in the selected fake network policy is: constructing and sending a response packet, or redirecting the first packet to the honeypot device, where the response packet is used to indicate that the destination port is in an open state. A TCP packet is a packet used to detect whether a TCP service exists in a destination port (that is, whether a port is in an open state) in a network device. In the foregoing design, when the first packet is the TCP packet, and the destination port is the first port in the fake network, the network security device responds, by using an existing packet matching technology, to the external device a packet used to indicate that the destination port is in the open state. In this case, the attacker mistakenly considers that the port corresponding to the destination port number has an open TCP service at a node corresponding to the destination IP address in the protected network, so that an attack activity of the attacker can be interfered and misled at relatively low costs. Alternatively, the network security device redirects the first packet to the honeypot device, so that the first packet may be analyzed and detected by the honeypot device, thereby improving security of the protected network; and a network security defense may be implemented by deploying a small quantity of honeypot devices, thereby reducing costs of the network security defense.

In a possible design, the matching condition in the selected fake network policy is: a protocol type is the TCP, and a destination port is not a first port in the fake network; and the action in the selected fake network policy is: constructing and sending a response packet, or redirecting the first packet to the honeypot device, where the response packet is used to indicate that the destination port is in an unopened state. In the foregoing design, when the first packet is the TCP packet, and the destination port is not the first port in the fake network, the network security device responds, to the external device by using an existing packet matching technology, a packet used to indicate that a destination port is in an unopened state. In this case, the attacker mistakenly considers that the port corresponding to the destination port number does not have an open TCP service at a node corresponding to the destination IP address in the protected network, so that an attack activity of the attacker can be interfered and misled at relatively low costs. Alternatively, the network security device redirects the first packet to the honeypot device, so that the first packet may be analyzed and detected by the honeypot device, thereby improving security of the protected network; and a network security defense may be implemented by deploying a small quantity of honeypot devices, thereby reducing costs of the network security defense.

The first port may be set based on an actual requirement. For example, the first port may be any port, whose port number is included in a first set, in all the nodes in the fake network, where the first set includes at least one port number; or the first port may be any port, whose port number is included in a second set, in the second node in the fake network, where the second set includes at least one port number; and so on.

If the first port may be any port, whose port number is included in a first set, in all the nodes in the fake network, the matching condition in the selected fake network policy is: a protocol type is the TCP, and a destination port number is a port number in the first set; and the action in the selected fake network policy is: constructing and sending a response packet, or redirecting the first packet to the honeypot device, where the response packet is used to indicate that the port that is in a destination device and that corresponds to the destination port number is in the open state, and an IP address of the destination device is the same as the destination IP address. Alternatively, the matching condition in the selected fake network policy is: a protocol type is the TCP, and a destination port number is not a port number in the first set; and the action in the selected fake network policy is: constructing and sending a response packet, or redirecting the first packet to the honeypot device, where the response packet is used to indicate that a port that corresponds to the destination port number and that is in a destination device is in the unopened state, and an IP address of the destination device is the same as the destination IP address.

If the first port is any port, whose port number is included in the second set, in the second node in the fake network, the matching condition in the selected fake network policy is: a protocol type is the TCP, a destination IP address is an IP address of a second node in the fake network, and a destination port number is a port number included in the second set; and the action in the selected fake network policy is: constructing and sending a response packet, or redirecting the first packet to the honeypot device, where the response packet is used to indicate the port that corresponds to the destination port number and that is in the second node is in the open state. Alternatively, the matching condition in the selected fake network policy is: a protocol type is the TCP, a destination IP address is not an IP address of the second node in the fake network and/or the destination port number is not a port number included in the second set; and the action in the selected fake network policy is: constructing and sending a response packet, or redirecting the first packet to the honeypot device, where the response packet is used to indicate that the port that corresponds to the destination port number and that is in the node corresponding to the destination IP address is in the unopened state.

In a possible design, the matching condition in the selected fake network policy is: a protocol type is a user datagram protocol (UDP), and a destination port is the second port in the fake network, where the destination port is determined based on the destination IP address and the destination port number; and the action in the selected fake network policy is: prohibiting answering the first packet, or redirecting the first packet to the honeypot device. A UDP packet is a packet used to detect whether a UDP service exists in the destination port in the network device (that is, whether a port is in the open state). In the foregoing design, when the first packet is the UDP packet, and the destination port is the second port in the fake network, the network security device does not respond to the first packet by using an existing packet matching technology. In this case, the attacker mistakenly considers the destination port in the protected network has an open UDP service, so that an attack activity of the attacker may be interfered and misled at relatively low costs. Alternatively, the network security device redirects the first packet to the honeypot device, so that the first packet may be analyzed and detected by the honeypot device, thereby improving security of the protected network; and a network security defense may be implemented by deploying a small quantity of honeypot devices, thereby reducing costs of the network security defense.

In a possible design, the matching condition in the selected fake network policy is: a protocol type is the UDP, and a destination port is not the second port in the fake network; and the action in the selected fake network policy is: constructing and sending a response packet, where the response packet is used to indicate that the destination port is unreachable, or redirecting the first packet to the honeypot device. In the foregoing design, when the first packet is the UDP packet, and the destination port is not the second port in the fake network, the network security device responds, to the external device by using an existing packet matching technology, a packet used to indicate that the port that corresponds to the destination port number and that is in the destination device is unreachable. In this case, the attacker mistakenly considers that a port that corresponds to the destination port number and that is in a node corresponding to the destination IP address in the protected network does not have an open UDP service, so that an attack activity of the attacker can be interfered and misled at relatively low costs. Alternatively, the network security device redirects the first packet to the honeypot device, so that the first packet may be analyzed and detected by the honeypot device, thereby improving security of the protected network; and a network security defense may be implemented by deploying a small quantity of honeypot devices, thereby reducing costs of the network security defense.

The second port may be set based on an actual requirement. For example, the second port may be any port, whose port number is included in a third set, in all the nodes in the fake network, where the third set includes at least one port number; or the second port may be any port, whose port number is included in a fourth set, in the third node in the fake network, where the fourth set includes at least one port number; and so on.

If the second port may be any port, whose port number is included in the third set, in all the nodes in the fake network, the matching condition in the selected fake network policy is: a protocol type is the UDP, and a destination port number is a port number included in the third set; and the action in the selected fake network policy is: prohibiting answering the first packet, or redirecting the first packet to the honeypot device. Alternatively, the matching condition in the selected fake network policy is: a protocol type is the UDP, and a destination port number is not a port number included in the third set; and the action in the selected fake network policy is: constructing and sending a response packet, where the response packet is used to indicate that a port that corresponds to the destination port number and that is in a destination device is unreachable, and an IP address of the destination device is the same as the destination IP address, or redirecting the first packet to the honeypot device.

If the second port may further be any port, whose port number is included in the fourth set, in the third node in the fake network, the matching condition in the selected fake network policy is: a protocol type is the UDP, and a destination IP address is an IP address of a fourth node in the fake network, and a destination port number is a port number included in the fourth set; and the action in the selected fake network policy is: prohibiting answering the first packet, or redirecting the first packet to the honeypot device. Alternatively, the matching condition in the selected fake network policy is: a protocol type is the UDP, a destination IP address is not an IP address of a fourth node in the fake network and/or a destination port number is not a port number included in the fourth set; and the action in the selected fake network policy is: constructing and sending a response packet, or redirecting the first packet to the honeypot device, where the response packet is used to indicate that a port that corresponds to the destination port number and that is in a node corresponding to the destination IP address is unreachable.

In a possible design, when constructing and sending a response packet, the network security device first construct the response packet, and send the response packet after a delay of preset duration. In the foregoing design, by delaying sending the response packet, the attack activity may be delayed, thereby prolonging warning time.

In a possible design, the matching condition in the selected fake network policy is: a destination IP address is an IP address of a fifth node in the fake network; and the action in the selected fake network policy is: redirecting the first packet to the honeypot device. In the foregoing design, when the destination IP address of the first packet is the IP address of the fifth node in the fake network, the network security device redirects the first packet to the honeypot device, so that the first packet may be analyzed and detected by the honeypot device, and a network security defense may be implemented by deploying a small quantity of honeypot devices, thereby reducing costs of the network security defense.

In a possible design, when processing the first packet based on a firewall policy, the network security device first constructs a response packet in a first packet format based on the firewall policy, and sends the response packet in the first packet format to the external device. The first packet format is a packet format corresponding to a first system type. The first system type is inconsistent with a second system type corresponding to a first internal device. The first internal device is located in the protected network, and an IP address of the first internal device is the same as the destination IP address. Packets sent by different types of operating systems have different formats. By analyzing a format of a packet, the attacker determines a system type of a network device sending the packet. Because operating systems of different types have different vulnerabilities, an attacker may launch a network attack to a vulnerability existing in a system type of the network device. In the foregoing design, by modifying the packet format of the response packet in the first packet format, the network security device disguises the system type of the network device, and hides vulnerability information of the network device, and in this case, the attacker may obtain an incorrect determining result when determining the operating system type of the network device.

In a possible design, after receiving a second packet sent by a second internal device, the network security device modifies a packet format of the second packet to a second packet format, and forwards the second packet in the second packet format. The second internal device is any device in the protected network, and a third system type corresponding to the second packet format is inconsistent with a fourth system type corresponding to the second internal device. In the foregoing design, by modifying the packet format of the response packet in the second packet format, the network security device disguises the system type of the second internal device, and hides vulnerability information of the second internal device, and in this case, the attacker may obtain an incorrect determining result when determining the operating system type of the second internal device.

According to a second aspect, this application provides a network security device, to perform the method according to any one of the first aspect or the possible implementations of the first aspect. Specifically, the network security device includes units configured to perform the method according to any one of the first aspect or the possible implementations of the first aspect. These units may be implemented by a program module, or may be implemented by hardware or firmware. For details, refer to the detailed descriptions in the embodiments, and details are not described herein.

According to a third aspect, this application provides a network security device. The device includes a network interface, a memory, and a processor. The memory is configured to store program code required to be executed by the processor. The network interface is configured to receive or send a packet. The processor is configured to execute the program code stored in the memory, and is specifically configured to execute the method according to any one of the first aspect or the designs of the first aspect.

According to a fourth aspect, this application further provides a computer-readable storage medium. The computer-readable storage medium is configured to store a computer software instruction used to perform a function in the first aspect or any design of the first aspect, and the computer software instruction includes a program designed to perform the method according to any one of the first aspect or the designs of the first aspect.

According to a fifth aspect, the embodiments of this application provide a computer program product including an instruction. When the computer program product is operated on a computer, the computer is enabled to perform the method according to any one of the first aspect or the possible design manners of the first aspect.

According to a sixth aspect, the embodiments of this application provide a chip system. The chip system includes a processor. The processor is configured to support the network security device in implementing a function in the first aspect or any possible design manner of the first aspect. In a possible design, the chip system further includes a memory. The memory is configured to store a program instruction and data necessary for the network security device. The chip system may include a chip, or may include a chip and another discrete device.

It should be understood that the technical solutions of the second to sixth aspects in the embodiments of this application are consistent with those of the first aspect in the embodiments of this application, beneficial effects achieved by the aspects and the corresponding implementable design manners are similar, and details are not described herein again.

DESCRIPTION OF EMBODIMENTS

To make the objectives, technical solutions, and advantages of this application clearer, the following further describes this application in detail with reference to the accompanying drawings.

This application provides a method and an apparatus for defending against a network attack, to resolve a problem that network defense costs are relatively high. The method and the apparatus are conceived based on a same invention. Because the method and the apparatus have a similar principle for resolving a problem, reference may be made between an implementation of the apparatus and an implementation of the method, and a repeated part is not described.

Figure 1:
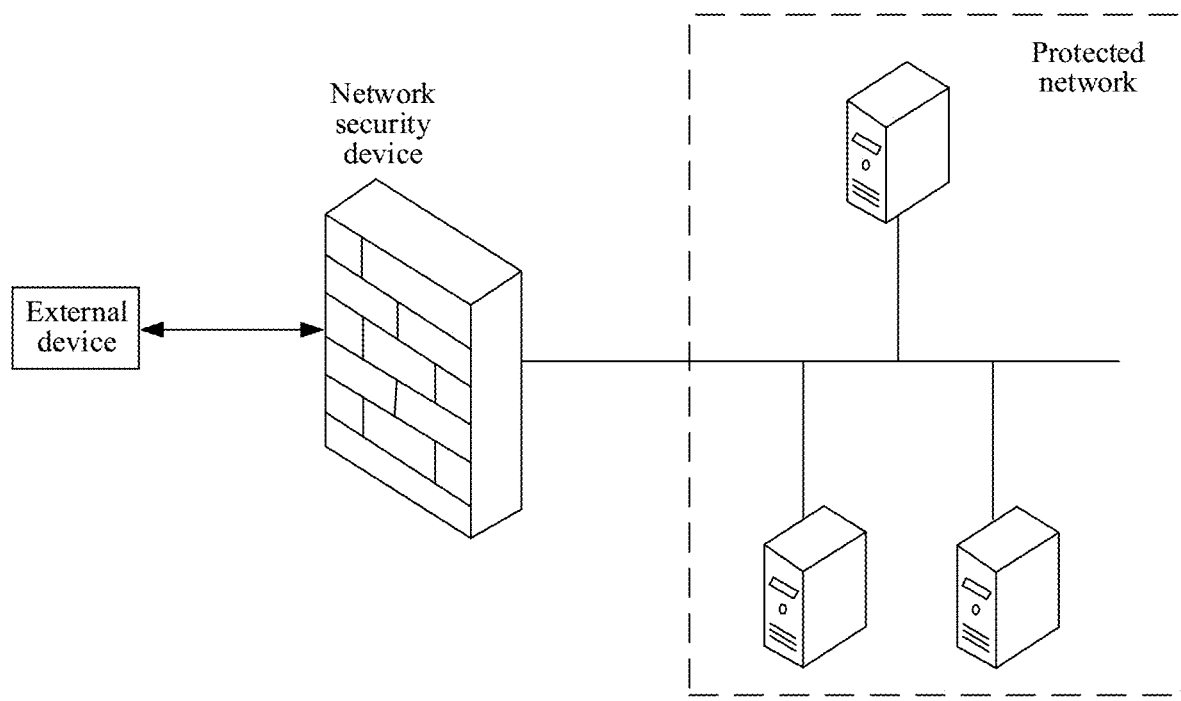
FIG. 1 is a schematic architectural diagram of a network system according to this application.

The method for defending against a network attack in this application may be applicable to a plurality of system architectures. FIG. 1 is a schematic architectural diagram of a network system applicable to this application. The system includes an external device, a network security device and a protected network, where the network security device is deployed between the protected network and an external network in which the external device is located. The network security device may be configured to filter a packet sent by the external device to the protected network, for example, allow an authorized packet to pass or restrict an attack packet to passing, thereby protecting the protected network from intrusion of an unauthorized user. The network security device may be an independent device, or may be deployed on another device, such as a router device, a firewall device, or a gateway device. The external device may be, but is not limited to, a computer device, a router device, or the like. The protected network includes at least one real node, and the real node may be, but is not limited to, a router device, a computer device, or the like.

A process of launching a network attack by an attacker is: First, network scanning is performed on the protected network. The network scanning includes host scanning, transmission control protocol (TCP) port scanning, and user datagram protocol (UDP) port scanning. A process of the host scanning is that, by sending an internet control message protocol (ICMP) packet to a node in the protected network, the attacker detects whether a destination IP address is reachable, and the node in the protected network responds to the ICMP packet based on an actual situation of the protected network. After detecting the ICMP packet for many times, the attacker may obtain a network topology structure of the protected network based on a received response packet. A process of the TCP port scanning is that the attacker first sends a TCP SYN packet to a port of a node in the protected network, and if the port has an open TCP service, the node makes a response by using a TCP SYN ACK packet, or otherwise, makes a response by using a TCP RST packet. The attacker determines, by using a received response packet, whether the port has the open TCP service. There are several flag fields such as SYN, ACK, and RST in a header of a TCP packet. SYN is a synchronization connection sequence number flag bit, and in the TCP SYN packet, this flag is set to 1, to request to establish a connection. ACK is a request/answer state flag bit, 0 means to request, 1 means to answer, and in the TCP SYN ACK packet, this flag is set to 1. RST is a line connection reset flag bit, and in the TCP RST packet, this flag is set to 1. A process of the UDP port scanning is that the attacker first sends a UDP packet to request a connection after detecting an ICMP packet for many times. If the port has an open UDP service, the node does not respond to the UDP packet, or otherwise, responds to the ICMP packet which indicates that the port is unreachable. The attacker determines whether the port has the open UDP service based on a received response packet. After performing the network scanning, based on a packet format of the response packets received in the network scanning process, the attacker analyzes a system type of each node in the protected network, and attacks the node based on vulnerability of the system type of the node.

A conventional network security defense technology conforms to three steps of discovering, analyzing, and responding. To be specifically, only after an attacker initiates an attack to a destination device, a network security device collects an attack behavior and analyzes the attack behavior, and after extracting attack feature identification code, the network security device can effectively defend against the attack. However, by using this method, defense is performed later than an attack. Using SQL Slammer as an example, the SQL Slammer infects 90 percent of vulnerable servers in the first 10 minutes of its attack. However, a feature code is extracted after 48 hours. For the foregoing problem, in a current mainstream practice, a honeypot, a honeynet, or the like is deployed in a system. A honeypot is a computer system operated on the Internet. The honeypot simulates as a real network, a host, a service, or the like that is vulnerable to an attack, and acts as bait to lure a malicious attack. The value of the honeypot lies in collecting attack activity information on a network, and monitoring, detecting and analyzing the information. A honeynet is an overall network system architecture for trapping these attack activities. One honeynet system generally includes one or more honeypots. An objective of a honeynet system is to collect attack information of an intruder. Therefore, how to lure an attacker to attack a honeynet is an important part of a honeynet system. A defense method of deploying a honeypot or a honeynet may implement warning and detection before an attack causes substantial damage to a real system. The honeypot and honeynet technologies and the like are established based on data analysis. Compared with generating data, the data analysis is more difficult in the technologies, and requires higher cost. By deliberately constructing some data, the attacker can easily evade and escape detection of a honeypot. If it is intended to identify authenticity of data by using a honeypot, a large quantity of technical costs need to be paid. For the attacker, launching an attack by using an information obfuscation technology is as easy as throwing a handful of sand into a pile of white rice. For the honeypot, however, implementing effective network security defense is like sifting the sand out of the rice grain by grain. It can be learned that costs of a defense technology are much higher than those of an attack.

Based on this, according to the embodiments of this application, a technology of sending an obfuscation packet is introduced to the network security device, so that the network security device responds to the constructed obfuscation packet in the network scanning process of the attacker, to obfuscate real information in the protected network; and the real information in the protected network is obfuscated in a large quantity of fake information, and the attacker cannot identify a real situation of the protected network. In this case, the attacker either abandons the attack or identifies authenticity of information through sophisticated data analysis. In the embodiments of this application, the network security device may not maintain a network connection state such as the TCP, and may not perform analysis processing on a network packet after the network packet is landed on the destination device. Instead, the network security device triggers an attack packet, and then sends an obfuscation packet based on a predetermined policy, to hide the real situation of the protected network at lower costs, send fake information to the attacker, and mislead the attack activity. In this way, the attack activity is exposed before the attack causes real damage. In addition, in the manner of sending an obfuscation packet, complex data analysis, network connection state maintenance, and the like are handed over to the attacker, so that attack costs of the attacker are increased, thereby resolving a problem of asymmetric costs of attacks and defenses.

In this application, "a plurality of" refers to two or more than two.

In addition, it should be understood that, in the description of this application, terms such as "first" and "second" are merely used for distinguishing the description and cannot be understood as indicating or implying relative importance, nor understood as indicating or implying a sequence.

Figure 2:
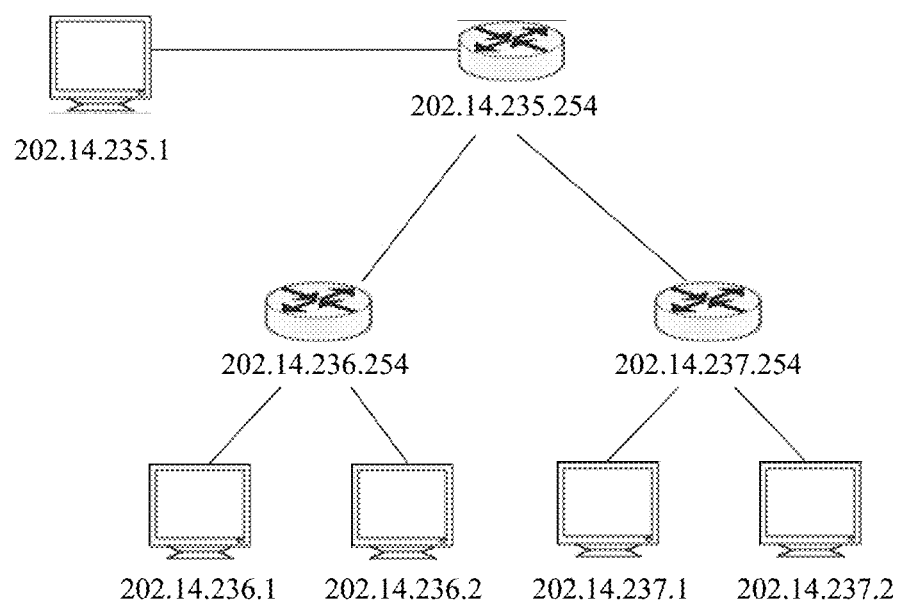
FIG. 2 is a schematic topological diagram of a fake network according to this application.

A firewall device is a device that performs matching (match) on a received network packet and performs an action (Action) based on a matching result, where the action includes blocking (block), forwarding (forward), network address translation (network address translation, NAT), and the like, to control a security protection device by using a packet. In the embodiments of this application, the network security device maintains the basic workflow of the firewall device unchanged, and stores configuration information of a fake network, so that when the attacker performs network scanning, the network security device may construct a response packet based on a fake network policy to deceive the attacker, so that real information of a protected network is hidden, the attacker is induced to launch an attack to the fake network, and a probability that the protected network is attacked is reduced. The configuration information of the fake network includes an internet protocol IP address of each node in the fake network, and further includes a topological relationship between nodes. For example, as shown in FIG. 2, the configuration information of the fake network may include three gateway nodes whose internet protocol (IP) addresses are 202.14.235.254, 202.14.236.254 and 202.14.237.254. A gateway node with an IP address of 202.14.235.254 is connected to a gateway node with an IP address of 202.14.236.254 and a gateway node with an IP address of 202.14.237.254. The gateway node with the IP address of 202.14.235.254 is connected to one end node, where an IP address of the end node is 202.14.235.1. The gateway node with the IP address of 202.14.236.254 is connected to two end nodes, where IP addresses of the two end nodes are 202.14.2361 and 202.14.236.2. The gateway node with the IP address of 202.14.237.254 is connected to two end nodes, where IP addresses of the two end nodes are 202.14.237.1 and 202.14.237.2. Each fake network policy includes a matching condition and an action corresponding to the matching condition, where the action includes constructing and sending a response packet, or prohibiting answering a packet, or redirecting the packet to a honeypot device, or the like.

Figure 3:
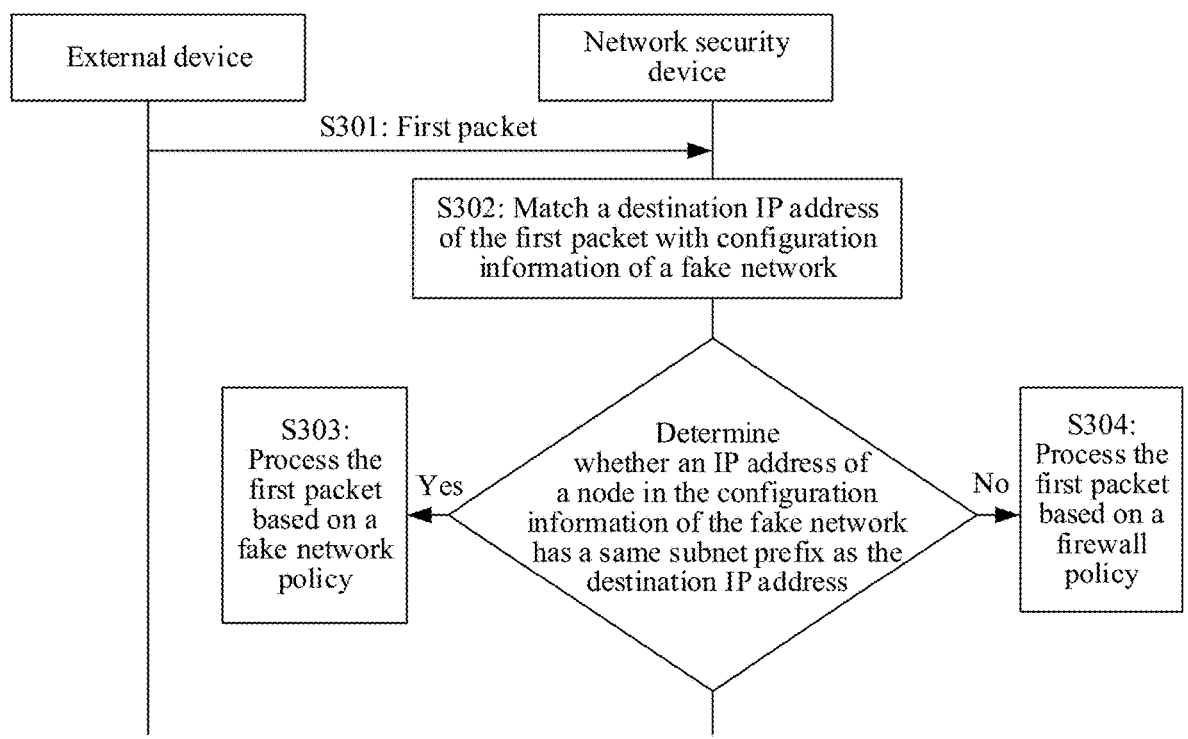
FIG. 3 is a flowchart of a method for defending against a network attack according to this application.

FIG. 3 is a flowchart of a method for defending against a network attack by a network security device according to this application. The method may be used in the network system shown in FIG. 1, and the method includes:

S301. The network security device receives a first packet sent by an external device.

S302. The network security device matches a destination IP address of the first packet with configuration information of a fake network.

Specifically, the network security device may first obtain quintuple information of the first packet, where the quintuple information is a protocol type, a source IP, a source port, a destination IP address, and a destination port of a network packet, and match the destination IP address in the quintuple information of the first packet with the configuration information of the fake network.

If an IP address of a node in the configuration information of the fake network has a same subnet prefix as the destination IP address, step S303 is performed.

S303. The network security device processes the first packet based on a fake network policy.

If no IP address of a node in the configuration information of the fake network has a same subnet prefix as the destination IP address, step S304 is performed.

S304. The network security device processes the first packet based on a firewall policy.

The firewall policy is a policy adopted by a firewall device to process a network packet in the prior art. The firewall policy in the prior art may include two parts, that is, a matching part and an action part. The matching part performs quintuple information matching on a network packet. The action part operates a network packet or traffic based on a preset policy based on a matching result obtained from the matching part. Actions may be drop (Drop), reject (Reject), accept (Accept), jump (Jump), or the like. Specifically, the firewall policy may be implemented by using the following code:

-p TCP -s 192.168.0.0/16 -d 0.0.0.0/0 --dport=80 -j DROP // After receiving a TCP packet whose source IP address has a subnet prefix of 192.168.0.0/16, and whose destination port number is 80, a firewall drops the TCP packet; or -p TCP-s 192.168.0.0/16 -d 10.10.10.1/32 --dport=22 -j Accept // A firewall allows a TCP packet whose source IP address has a subnet prefix of 192.168.0.0/16, whose destination IP address is 10.10.10.1 and whose destination port number is 22 to pass.

In this embodiment of this application, by matching the received packet with the configuration information of the fake network, and by performing processing such as responding to, or skipping answering the received packet based on the fake network policy, the network security device presents fake network topology to the attacker. In this case, the attacker mistakenly considers that each node in the fake network really exists in a protected network, and cannot simply distinguish real nodes from fake nodes through scanning. Compared with a method of deploying a large quantity of honeypots in the prior art, in this embodiments of this application, a gateway device presents fake network topology to the attacker by using an existing packet matching technology, so that a probability that a real system is attacked for the first time can be reduced. In addition, in this method, the attacker needs to pay more costs for data analysis to determine a real node and a fake node, so that an attack activity of the attacker can be interfered or misled at relatively low costs.

The fake network shown in FIG. 2 is used as an example, the network security device may match the quintuple information of the first packet with the configuration information of the fake network by using the following code. In the following code, code before ":" is a matching condition, and code after ":" is an action corresponding to the matching condition:

<Any_Protocol> <Any_SourceIP> <Any_SourcePort>→<202.14.235.0/24> <Any_DestPort>: Packet Processing; // For a packet whose destination IP address has a subnet prefix of 202.14.235.0/24, the packet is processed based on the fake network policy, such as constructing a response packet, skipping responding, or redirecting to the honeypot device;

<Any_Protocol> <Any_SourceIP> <Any_SourcePort>→<202.14.236.0/24> <Any_DestPort>: Packet Processing; // For a packet whose destination IP address has a subnet prefix of 202.14.236.0/24, the packet is processed based on the fake network policy, such as constructing a response packet, skipping responding, and redirecting to the honeypot device; or <Any_Protocol> <Any_SourceIP> <Any_SourcePort>→<202.14.237.0/24> <Any_DestPort>: Packet Processing; // For a packet whose destination IP address has a subnet prefix of 202.14.237.0/24, the packet is processed based on the fake network policy, such as constructing a response packet, skipping responding, and redirecting to the honeypot device.

The network security device may process the first packet based on the fake network policy in the following manners:

A1. The network security device determines matching information of the first packet, where the matching information includes at least one of the following: a protocol type of the first packet, the destination IP address of the first packet, and a destination port number of the first packet.

Specifically, the network security device may determine the matching information of the first packet by analyzing the quintuple information of the first packet.

A2. The network security device separately matches the matching information of the first packet with a matching condition included in at least one fake network policy, and selects a fake network policy matching the first packet, where the matching information of the first packet meets a matching condition in a selected fake network policy.

A3. The network security device performs an action in the selected fake network policy.

To better understand the embodiments of the present invention, the fake network policy provided in this embodiment of this application is specifically described below by using the fake network shown in FIG. 2 as an example in combination with the network scanning process of the attacker.

Figure 4:
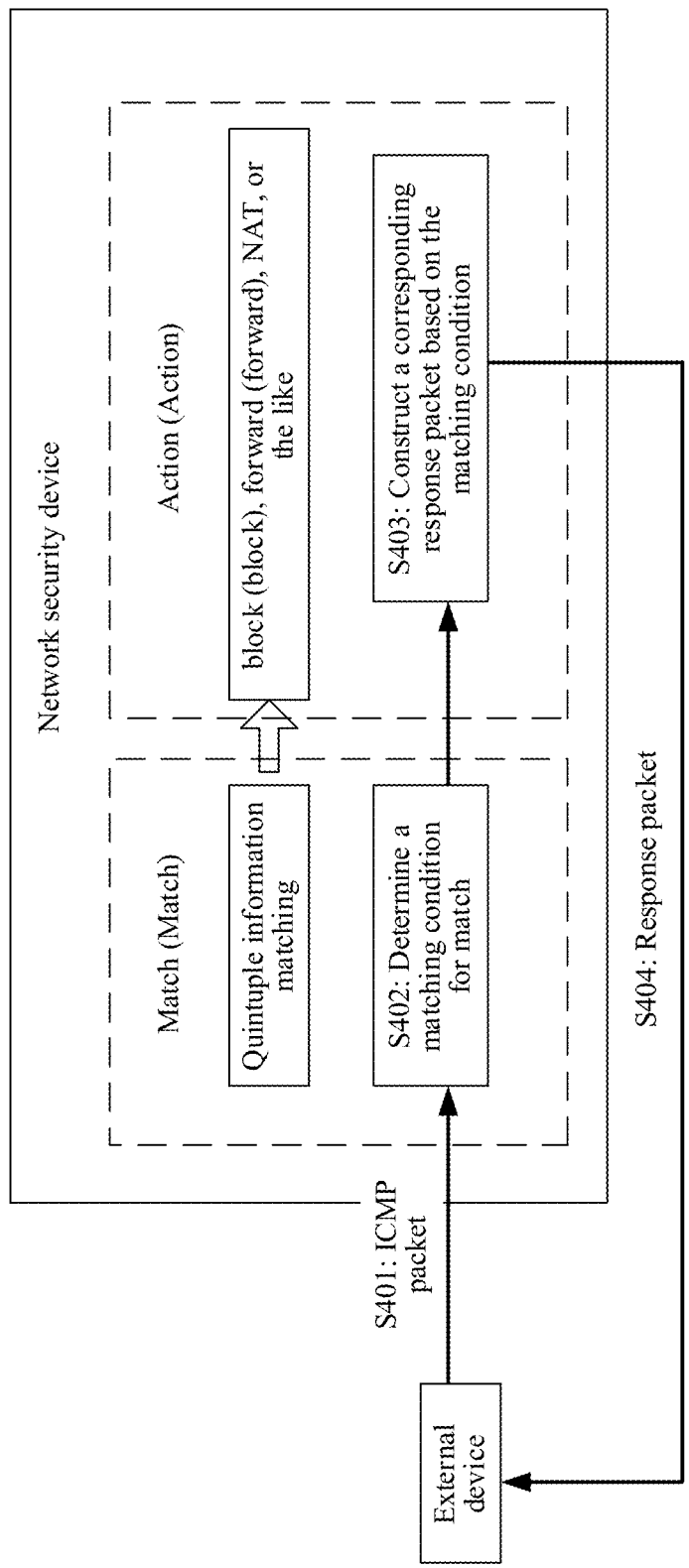
FIG. 4 is a flowchart of an answer host scanning method according to this application.

For the host scanning started by the attacker, in the embodiments of this application, the network security device saves the configuration information of the fake network, matches an IP address of an ICMP packet sent by the attacker with the configuration information of the fake network, and constructs a response packet based on the fake network policy, thereby presenting fake network topology to the attacker. As shown in FIG. 4:

S401. The network security device receives an ICMP packet sent by an external device.

S402. The network security device matches quintuple information of the ICMP packet with a matching condition in each fake network policy, and selects a fake network policy based on a matching result, where a matching condition in the selected fake network policy matches the quintuple information of the ICMP packet.

S403. The network security device constructs a response packet based on the selected fake network policy.

S404. The network security device sends the constructed response packet to the external device.

The selected fake network policy may be a fake network policy 1. The fake network policy 1 is that: a matching condition is: a protocol type is the ICMP, and a destination IP address is an IP address of a node in the fake network; and the action in the fake network policy is: constructing and sending a response packet, where the response packet is used to indicate that the destination IP address is reachable. In addition, the response packet may also carry a time to live, where the time to live is determined by the network security device based on a topological relationship of the fake network, and the time to live indicates a quantity of routing nodes through which a packet passes in a process of transmitting the packet to the first node. Based on the configuration information of the fake network shown in FIG. 2, the network security device may implement the fake network policy 1 by using the following code. In the following code, code before ":" is a matching condition, and code after ":" is an action in the fake network policy:

<ICMP_Protocol> <Any_SourceIP> <Any_SourcePort>→<202.14.235.254/32> <Any_DestPort>:<NODE><TTL-0> // It indicates that, in a protected network, there is a network node whose IP address is 202.14.235.254, and a TTL in a response packet needs to be reduced by 0;

<ICMP_Protocol> <Any_SourceIP> <Any_SourcePort>→<202.14.236.254/32> <Any_DestPort>:<NODE><TTL-1> // It indicates that a node corresponding to 202.14.236.254 is a network node in a protected network, and a TTL in a response packet needs to be reduced by 1;

<ICMP_Protocol> <Any_SourceIP> <Any_SourcePort>→<202.14.237.254/32> <Any_DestPort>:<NODE><TTL-1> // It indicates that a node corresponding to 202.14.237.254 is a network node in a protected network, and a TTL in a response packet needs to be reduced by 1;

<ICMP_Protocol> <Any_SourceIP> <Any_SourcePort>→<202.14.235.5/32> <Any_DestPort>:<NODE><TTL-1> // It indicates that a node corresponding to 202.14.235.5 is a network node in a protected network, and a TTL in a response packet needs to be reduced by 1;

<ICMP_Protocol> <Any_SourceIP> <Any_SourcePort>→<202.14.236.1/32> <Any_DestPort>:<NODE><TTL-2> // It indicates that a node corresponding to 202.14.236.1 is a network node in a protected network, and a TTL in a response packet needs to be reduced by 2;

<ICMP_Protocol> <Any_SourceIP> <Any_SourcePort>→<202.14.236.2/32> <Any_DestPort>:<NODE><TTL-2> // It indicates that a node corresponding to 202.14.236.2 is a network node in a protected network, and a TTL in a response packet needs to be reduced by 2;

<ICMP_Protocol> <Any_SourceIP> <Any_SourcePort>→<202.14.237.1/32> <Any_DestPort>:<NODE><TTL-2> // It indicates that a node corresponding to 202.14.237.1 is a network node in a protected network, and a TTL in a response packet needs to be reduced by 2; or <ICMP_Protocol> <Any_SourceIP> <Any_SourcePort>→<202.14.237.2/32> <Any_DestPort>:<NODE><TTL-2> // It indicates that a node corresponding to 202.14.237.2 is a network node in a protected network, and a TTL in a response packet needs to be reduced by 2.

The selected fake network policy may alternatively be a fake network policy 2. A matching condition in the fake network policy 2 is: a protocol type is the ICMP, and a destination IP address is a first IP address, where the first IP address is not an IP address of any node in the fake network, and the first IP address has a same subnet prefix as a node in the fake network; and the action in the fake network policy is: constructing and sending a response packet, where the response packet is used to indicate that the destination IP address is unreachable and an IP address of a gateway device corresponding to a subnet prefix of the destination IP address is reachable. In addition, the response packet may further carry a time to live, where the time to live is determined by the network security device based on the topological relationship of the fake network, and the time to live indicates a quantity of routing nodes through which a packet passes in a process of transmitting the packet to the gateway device corresponding to the subnet prefix of the destination IP address. Based on the configuration information of the fake network shown in FIG. 2, an example in which the first IP address is 202.14.235.8/32 is used as an example, the network security device may implement the fake network policy 2 by using the following code. In the following code, code before ":" is a matching condition, and code after ":" is an action in the fake network policy:

<ICMP_Protocol> <Any_SourceIP> <Any_SourcePort>→<202.14.235.8/32> <Any_DestPort>:<NETWORK> <GW=202.14.235.254><TTL-1> // In a protected network, there is not a node whose IP address is 202.14.235.8/32, and there is a gateway whose IP address is 202.14.235.254. A TTL in a response packet needs to be reduced by 1.

In addition, if no IP address of a node in the configuration information of the fake network has a same subnet prefix as the destination IP address, and no IP address of a node in the protected network has a same subnet prefix as the destination IP address, the network device may also construct and send a response packet, where the response packet is used to indicate that the destination IP address is unreachable. The network security device may implement the fake network policy by using the following code. In the following code, code before ":" is a matching condition, and code after ":" is an action corresponding to the matching condition:

<ICMP_Protocol><Any_SourceIP><Any_SourcePort>→<Some_DestIP><Any_DestPort>:<UNREACHABLE> // For a packet whose destination IP address is Some_DestIP, a host-unreachable packet is returned, where Some_DestIP is neither in the fake network, nor in the protected network.

Using 202.14.230.0/24 which is neither in the fake network, nor in the protected network as an example, the network security device may respond to an ICMP packet whose destination IP address has a subnet prefix of 202.14.230.0/24 by using a host-unreachable packet by using the following code. In the following code, code before ":" is a matching condition, and code after ":" is an action corresponding to the matching condition:

<ICMP Protocol> <Any_SourceIP> <Any_SourcePort>→<202.14.230.0/24> <Any_DestPort>:<UNREACHABLE>: // For an ICMP packet whose destination IP address has a subnet prefix of 202.14.230.0/24, a host-unreachable packet is sent.

For example, the first packet is an ICMP echo request (Echo Request) packet whose destination IP address is 202.14.237.2. If the network security device determines that the ICMP echo request packet meets "<ICMP_Protocol> <Any_SourceIP> <Any_SourcePort>:><202.14.237.2/32> <Any_DestPort>", the network security device constructs an ICMP echo reply (Echo Reply) packet in which a source IP address is 202.14.237.2, and a TTL is reduced by 2 based on "<ICMP_Protocol><Any_SourceIP> <Any_SourcePort>→<202.14.237.2/32> <Any_DestPort>:<NODE> <TTL-2>" in the fake network policy 1, and sends the packet to an external device. In this case, the external device considers that 202.14.237.2 really exists in the protected network of the network security device, and the external device determines a location of 202.14.237.2 in the protected network, that is, in a process of sending the first packet to the 202.14.237.2, the first packet needs to pass through two routing nodes.

For example, the first packet is an ICMP echo request packet whose destination IP address is 202.14.235.8. If the network security device determines that the ICMP echo request packet meets "<ICMP_Protocol> <Any_SourceIP> <Any_SourcePort>→<202.14.235.8/32> <Any_DestPort>", the network security device constructs an ICMP echo reply packet indicating that "there is a gateway node whose IP address is 202.14.235.254, and a TTL is reduced by 1" based on "<ICMP_Protocol><Any_SourceIP> <Any_SourcePort>→<202.14.235.8/32> <Any_DestPort>: <NETWORK> <GW=202.14.235.254><TTL-2>" in the fake network policy 2, and sends the packet to an external device, and the external device believes that 202.14.235.8 does not exist in the protected network of the network security device, and the gateway node corresponding to the subnet prefix of 202.14.235.8 really exists in the protected network. The IP address of the gateway node is 202.14.235.254, and in a process of sending the first packet to the 202.14.235.254, the first packet needs to pass through two routing nodes.

For example, the first packet is an ICMP echo request packet whose IP address is 202.14.239.11/32. If the network security device determines that a destination IP address of the ICMP echo request packet is neither in the fake network, nor in the protected network, the network security device constructs a host-unreachable packet.

In this way, after detecting the ICMP packet for many times, the attacker may obtain network topology of the protected network of the network security device. In the embodiments of this application, the network security device constructs a response packet based on the configuration information of the fake network and the fake network policy, and sends the response packet to the attacker, the attacker may obtain fake network topology, so that an attack activity of the attacker is interfered or misled, a probability that the protected network is attacked is reduced, and the attacker is forced to analyze data to identify authenticity of information, thereby increasing attack costs of the attacker.

Figure 5:
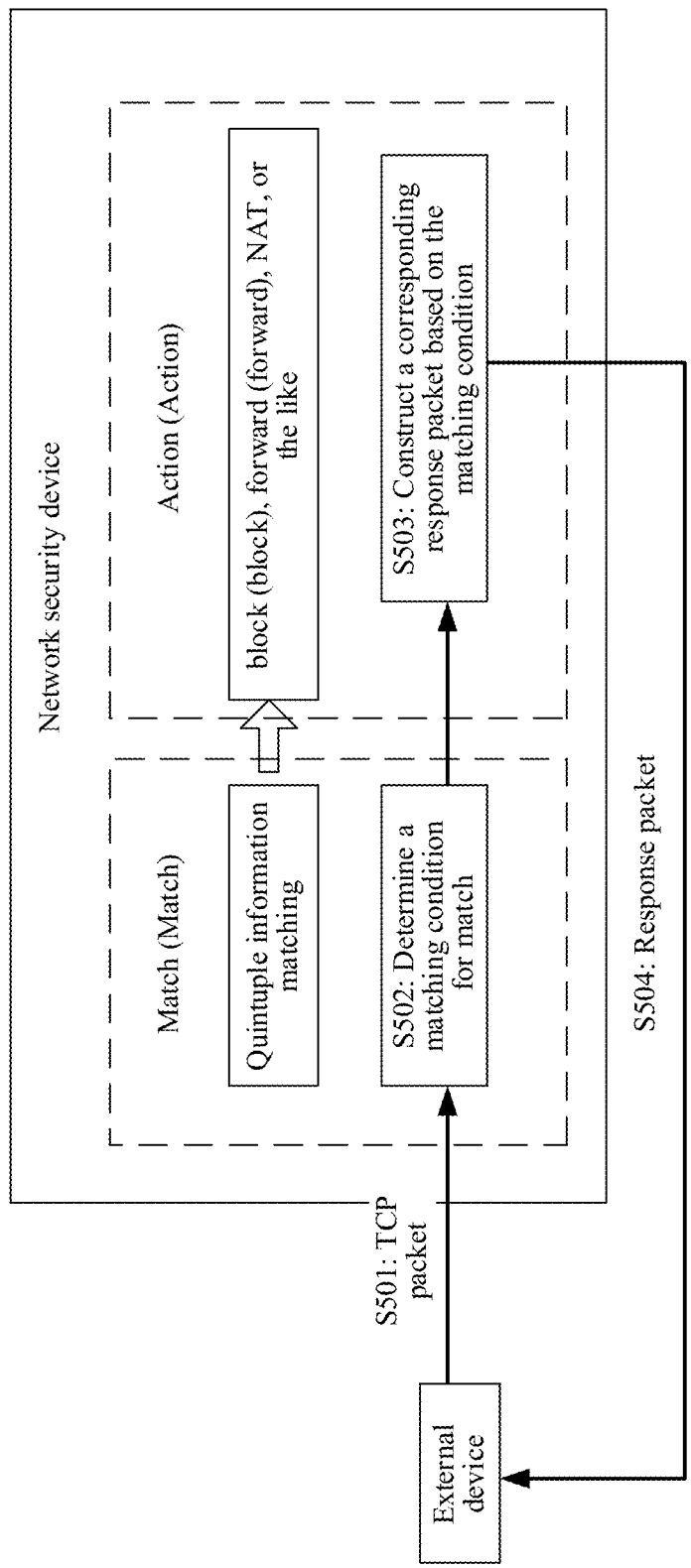
FIG. 5 is a flowchart of an answer TCP port scanning method according to this application.

For a TCP port scanning process initiated by an attacker, in the embodiments of this application, after receiving a TCP packet sent by the attacker, a network security device matches the TCP packet with a matching condition in a fake network policy, and constructs an SYN ACK packet or an RST packet based on a successfully matched fake network policy, to present the attacker that a TCP service does not exist in a fake network. As shown in FIG. 5:

S501. The network security device receives a TCP packet sent by an external device.

S502. The network security device matches quintuple information of the TCP packet with a matching condition in each fake network policy, and selects a fake network policy based on a matching result, where a matching condition in the selected fake network policy matches the quintuple information of the TCP packet.

S503. The network security device constructs a response packet based on the selected fake network policy.

S504. The network security device sends the constructed response packet to the external device.

The selected fake network policy may be a fake network policy 3. The fake network policy 3 is that: a matching condition is: a protocol type is the TCP, and a destination port is a first port in the fake network, where the destination port is determined based on the destination IP address and the destination port; and the corresponding action is: constructing and sending a response packet, where the response packet is used to indicate that the destination port is in an open state.

The selected fake network policy may also be a fake network policy 4. A matching condition in the fake network policy 4 is: the protocol type is the TCP, and a destination port is a second port in the fake network; and the action in the fake network policy is: constructing and sending a response packet, where the response packet is used to indicate that the destination port is in an unopened state.

The first port may be any port in the fake network. For example, the first port may be a port with a port number ranging from 1 to 1024 in all nodes whose IP addresses have a subnet prefix of 202.14.236.0/24 in the fake network, or the first port may be a port with a port number ranging from 1 to 1024 in all nodes whose IP addresses are 202.14.236.1 in the fake network, or the like. The embodiments of this application are not specifically limited herein. The second port may be any port different from the first port in the fake network.

For example, the first port is a port with a port number ranging from 1 to 1024 in all nodes whose IP addresses have a subnet prefix of 202.14.236.0/24 in the fake network; and the second port is any port in a node whose destination IP address has a subnet prefix of 202.14.235.0/24 in the fake network, or any port in a node whose destination IP address has a subnet prefix of 202.14.237.0/24, or a port with a port number ranging from 1025 to 65535 in all nodes whose destination IP addresses have a subnet prefix of 202.14.236.0/24. The fake network policy 3 may be that: a matching condition is: a protocol type is the TCP, and a subnet prefix of a destination IP address is 202.14.236.0/24, and the destination port number is included in {1,2,3 . . . 1023,1024}; and the action in the fake network policy is: constructing and sending a response packet, where the response packet is used to indicate that, in the destination device, a port corresponding to the destination port number is in the open state, and an IP address of the destination device is the same as the destination IP address. The network security device may implement the fake network policy 3 by using the following code. In the following code, code before ":" is a matching condition, and code after ":" is an action in the fake network policy:

<TCP_Protocol> <Any_SourceIP> <Any_SourcePort> <TCP_SYN=1>→<202.14.236.0/24> <TCP_Port=1:1024>:<TCP> <TCP_SYN ACK> // In a node whose IP address has a subnet prefix of 202.14.236.0/24, a port with a port number ranging from 1 to 1024 has an open TCP service.

The fake network policy 4 may be that: a matching condition is: a protocol type is the TCP, and a subnet prefix of a destination IP address is 202.14.235.0/24, or the matching condition is: a protocol type is the TCP, and a subnet prefix of a destination IP address is 202.14.237.0/24, or the matching condition is: a protocol type is the TCP, and a subnet prefix of a destination IP address is 202.14.236.0/24, and a destination port number is included in {1025, 1026, 1027, . . . 65534, 65535}; and an action in the fake network policy is: constructing and sending a response packet, where the response packet is used to indicate that, a port that is in a destination device and corresponds to the destination port number is in the unopened state, and an IP address of the destination device is the same as the destination IP address. The network security device may implement the fake network policy 4 by using the following code. In the following code, code before ":" is a matching condition, and code after ":" is an action in the fake network policy:

<TCP_Protocol><Any_SourceIP><Any_SourcePort> <TCP_SYN=1>→<202.14.235.0/24> <Any_DestPort>: <TCP> <TCP_RST> // In a node whose IP address has a subnet prefix of 202.14.235.0/24, a port does not have an open TCP service;

<TCP_Protocol><Any_SourceIP><Any_SourcePort> <TCP_SYN=1>→<202.14.237.0/24> <Any_DestPort>: <TCP> <TCP_RST> // In a node whose IP address has a subnet prefix of 202.14.237.0/24, a port does not have an open TCP service; or <TCP_Protocol><Any_SourceIP><Any_SourcePort> <TCP_SYN=1>→<202.14.236.0/24><TCP_Port=1025: 65535>:<TCP_RST> // In a node whose IP address has a subnet prefix of 202.14.236.0/24, a port with a port number ranging from 1025 to 65535 does not have an open TCP service.

For example, the first packet is a TCP packet whose destination IP address is 202.14.236.2 and whose destination port number is 566. If the network security device determines that the TCP packet meets "<TCP_Protocol> <Any_SourceIP> <Any_SourcePort> <TCP_SYN=1>→<202.14.236.0/24> <TCP_Port=1: 1024>", the network security device constructs an SYN ACK packet and sends the SYN ACK packet to the external device based on "<TCP_Protocol> <Any_SourceIP> <Any_SourcePort> <TCP_SYN=1>→<202.14.236.0/24> <TCP_Port=1:1024>: <TCP><TCP_SYN ACK>" in the fake network policy 3, so that the external device believes that a port whose destination IP address is 202.14.236.2 and whose port number is 566 has an open TCP service.

For example, the first packet is a TCP packet whose destination IP address is 202.14.237.2 and whose destination port number is 2566. If the network security device determines that the TCP packet meets "<TCP_Protocol> <Any_SourceIP><Any_SourcePort> <TCP_SYN=1>→<202.14.237.0/24> <Any_DestPort>", the network security device constructs an RST packet and sends the RST packet to the external device based on "<TCP_Protocol>→<Any_SourceIP> <Any_SourcePort> <TCP_SYN=1>→<202.14.237.0/24><Any_DestPort>:<TCP><TCP_RST>" in the fake network policy 4, so that the external device believes that a port whose destination IP address is 202.14.237.2 and whose port number is 2566 does not have an open TCP service.

In this way, after performing TCP port scanning for many times, the attacker may consider that, in nodes corresponding to all IPs whose subnet prefix in the fake network is 202.14.236.0/24, a port with a port number ranging from 1 to 1024 has an open TCP service, and another port in the fake network does not have an open TCP service.

For example, the first port is a port with a port number ranging from 1 to 1024 in a node whose IP address in the fake network is 202.14.236.1, and the second port is any port in a node whose destination IP address has a subnet prefix of 202.14.235.0/24in the fake network, or any port in a node whose destination IP address has a subnet prefix of 202.14.237.0/24, or any port in a node whose destination IP address is 202.14.236.2/32, or a port with a port number ranging from 1025 to 65535 in a node whose destination IP address is 202.14.236.1/32, the fake network policy 3 may be that: the matching condition is: a protocol type is the TCP, and a destination IP address is 202.14.236.1, and a destination port number is included in {1,2,3 . . . 1023,1024}; and the action in the fake network policy is: constructing and sending a response packet, where the response packet is used to indicate that, in a node corresponding to a destination IP address, a port corresponding to the destination port number is in an open state. The network security device may implement the fake network policy by using the following code. In the following code, code before ":" is a matching condition, and code after ":" is an action in the fake network policy:

<TCP_Protocol><Any_SourceIP><Any_SourcePort><TCP_SYN=1>→<202.14.236.1/32><TCP Port=1:1024>: <TCP><TCP_SYN ACK> // In a node whose IP address is 202.14.236.1, a port with a port number ranging from 1 to 1024 has an open TCP service.

The fake network policy 4 may be that: the matching condition is: a protocol type is the TCP, and a subnet prefix of a destination IP address is 202.14.235.0/24, or the matching condition is: a protocol type is the TCP, and a subnet prefix of a destination IP address is 202.14.237.0/24, or the matching condition is: a protocol type is the TCP, and a destination IP address is 202.14.236.2/32, or the matching condition is: a protocol type is the TCP, a destination IP address is 202.14.236.1/32, and a destination port number is included in {1025, 1026, 1027, . . . 65534, 65535}; and the action in the fake network policy is: constructing and sending a response packet, where the response packet is used to indicate that, in a node corresponding to a destination IP address, a port corresponding to the destination port number is in an unopened state. The network security device may implement the fake network policy by using the following code. In the following code, code before ":" is a matching condition, and code after ":" is an action in the fake network policy:

<TCP_Protocol><Any_SourceIP><Any_SourcePort><TCP_SYN=1>→<202.14.235.0/24><Any_DestPort>: <TCP><TCP_RST> // In a node whose IP address has a subnet prefix of 202.14.235.0/24, a port does not have an open TCP service.

<TCP_Protocol><Any_SourceIP><Any_SourcePort><TCP_SYN=1>→<202.14.237.0/24><Any_DestPort>: <TCP><TCP_RST> // In a node whose IP address has a subnet prefix of 202.14.237.0/24, a port does not have an open TCP service.

<TCP_Protocol><Any_SourceIP><Any_SourcePort><TCP_SYN=1>→<202.14.236.2/32><Any_DestPort>: <TCP_RST> // In a node whose IP address is 202.14.236.2, each port does not have an open TCP service.

<TCP_Protocol><Any_SourceIP><Any_SourcePort><TCP_SYN=1>→<202.14.236.1/32> <TCP_Port=1025: 65535>:<TCP_RST> // In a node whose IP address is 202.14.236.1, a port with a port number ranging from 1025 to 65535 does not have an open TCP service.

For example, the first packet is a TCP packet whose destination IP address is 202.14.236.1 and whose destination port number is 566. If the network security device determines that the TCP packet meets "<TCP_Protocol> <Any_SourceIP> <Any_SourcePort> <TCP_SYN=1>→<202.14.236.1/32> <TCP_Port=1: 1024>", the network security device constructs an SYN ACK packet and sends the SYN ACK packet to the external device based on "<TCP_Protocol> <Any_SourceIP> <Any_SourcePort> <TCP_SYN=1>→<202.14.236.1/32> <TCP_Port=1:1024>: <TCP> <TCP_SYN ACK>" in the fake network policy 3, so that the external device believes that a port whose destination IP address is 202.14.236.1 and whose port number is 566, has an open TCP service.

For example, the first packet is a TCP packet whose destination IP address is 202.14.237.2 and whose destination port number is 2566. If the network security device determines that the TCP packet meets "<TCP_Protocol> <Any_SourceIP> <Any_SourcePort> <TCP_SYN=1>→<202.14.237.0/24> <Any_DestPort>", the network security device constructs an RST packet and sends the RST packet to the external device based on "<TCP_Protocol> <Any_SourceIP> <Any_SourcePort> <TCP_SYN=1>→<202.14.237.0/24> <Any_DestPort>: <TCP> <TCP_RST>" in the fake network policy 4, so that the external device believes that a port whose destination IP address 202.14.237.2 and whose port number is 2566 does not have an open TCP service.

In this way, after performing TCP port scanning for many times, the attacker may consider that, in a node whose IP address in the fake network is 202.14.236.1, a port with a port number ranging from 1 to 1024 has an open TCP service, and another port in the fake network does not have an open TCP service.

Figure 6:
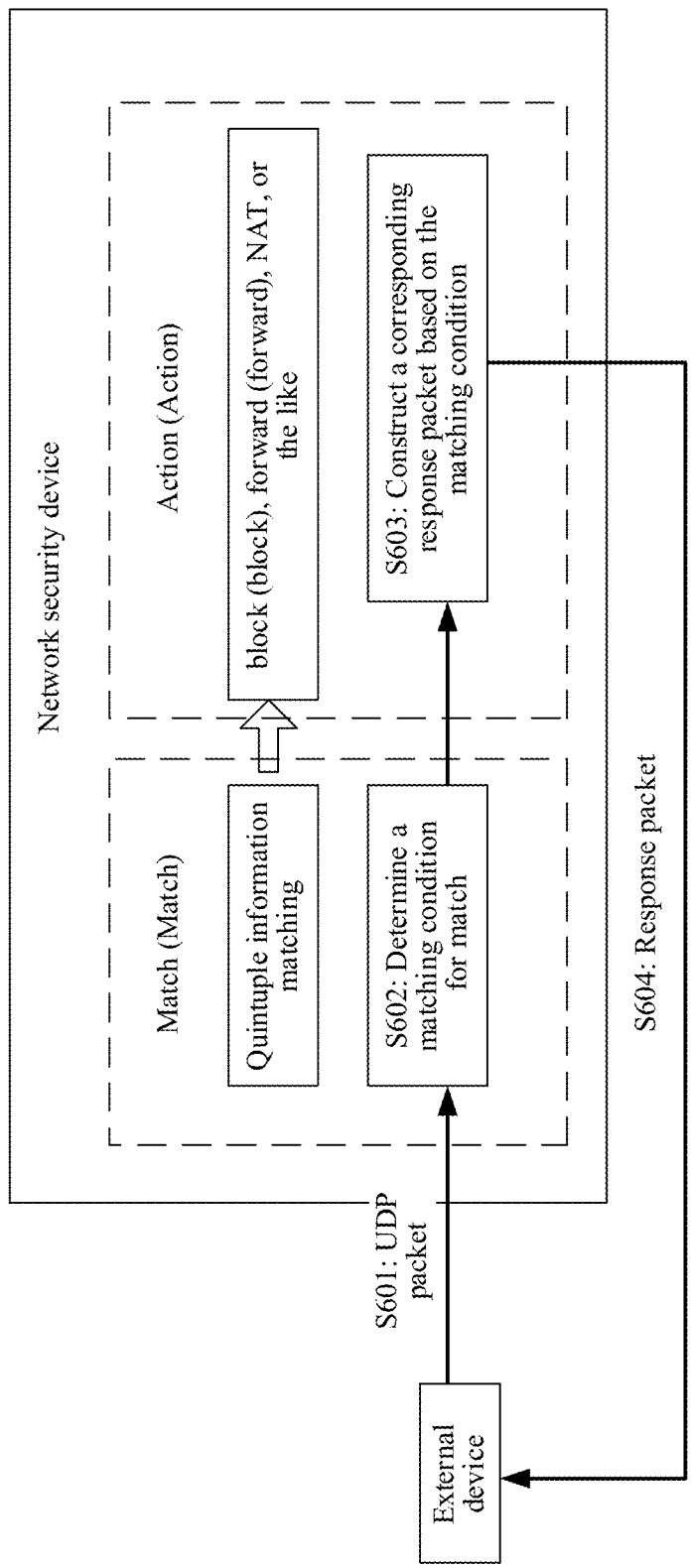
FIG. 6 is a flowchart of an answer UDP port scanning method according to this application.

For a UDP port scanning process initiated by an attacker, in the embodiments of this application, after receiving a UDP packet sent by the attacker, the network security device matches the UDP packet with a matching condition in a fake network policy, and based on a successfully matched fake network policy, does not respond to the UDP packet or constructs an ICMP packet which is used to indicate that a port is unreachable to present the attacker that a UDP service does not exist in a fake network. As shown in FIG. 6:

S601. The network security device receives a UDP packet sent by an external device.

S602. The network security device matches quintuple information of the UDP packet with a matching condition in each fake network policy, and selects a fake network policy based on a matching result, where a matching condition in the selected fake network policy matches the quintuple information of the UDP packet.

S603. The network security device constructs a response packet or skips answering based on the selected fake network policy.

S604. The network security device sends the constructed response packet to the external device.

The selected fake network policy may be a fake network policy 5. The fake network policy 5 is that: a matching condition is: a protocol type is the UDP, and a destination port is a third port in the fake network; and a corresponding action is: skipping answering the UDP packet.

The selected fake network policy may alternatively be a fake network policy 6. The fake network policy 6 is that: a matching condition is: a protocol type is the UDP, and a destination port is a fourth port in the fake network; and a corresponding action is: constructing and sending a response packet, where the response packet is used to indicate that the destination port is unreachable.

The third port may be any port in the fake network. For example, the third port may be a port with a port number of 53 in a node whose IP address is 202.14.237.1 in the fake network, the third port may alternatively be a port with a port number ranging from 1 to 1024 in all nodes whose IP addresses have a subnet prefix of 202.14.236.0/24 in the fake network, and so on. The embodiments of this application are not specifically limited herein. The fourth port may be any port different from the third port in the fake network.

For example, the third port is a port with a port number of 53 in a node whose IP address is 202.14.237.1 in the fake network, and the fourth port is any port in a node whose destination IP address has a subnet prefix of 202.14.235.0/24 in the fake network, or any port in a node whose destination IP address has a subnet prefix of 202.14.236.0/24, or a port with a port number ranging from 1 to 52 or from 54 to 65535 in a node whose destination IP address is 202.14.237.1/32, or any port in a node whose destination IP address is 202.14.237.2/32. The fake network policy 5 may be that: the matching condition is: a protocol type is the UDP, a destination IP address is 202.14.237.1, and a destination port number is 53; and the action in the fake network policy is: skipping answering. The network security device may implement the fake network policy 5 by using the following code. In the following code, code before ":" is a matching condition, and code after ":" is an action in the fake network policy:

<UDP_Protocol> <Any_SourceIP> <Any_SourcePort> <UDP_SYN=1>→<202.14.237.1/32> <UDP_Port=53>: <Skip answering> // In a node whose IP address is 202.14.237.1, a port with a port number of 53 have an open UDP service.

The fake network policy 6 may be that: a matching condition is: a protocol type is the UDP, and a subnet prefix of a destination IP address is 202.14.235.0/24, or a matching condition is: a protocol type is the UDP, and a subnet prefix of a destination IP address is 202.14.236.0/24, or a matching condition is: a protocol type is the UDP, a destination IP address is 202.14.237.1/32, and a destination port number is included in {1, 2, 3, . . . , 51, 52, 54, 55, . . . , 65534, 65535}; or a matching condition is: a protocol type is the UDP, a destination IP address is 202.14.237.2/32; and an action in the fake network policy is: constructing and sending a response packet, where the response packet is used to indicate that a port that is in a third node and that corresponds to the destination port number is in an unopened state. The network security device may implement the fake network policy by using the following code. In the following code, code before ":" is a matching condition, and code after ":" is an action in the fake network policy:

<UDP_Protocol> <Any_SourceIP> <Any_SourcePort> <UDP_SYN=1>→<202.14.235.0/24> <Any_DestPort>: <ICMP> <Cannot Reach a Port> // In a node whose IP address has a subnet prefix of 202.14.235.0/24, each port does not have an open UDP service;

<UDP_Protocol> <Any_SourceIP> <Any_SourcePort> <UDP_SYN=1>→<202.14.236.0/24> <Any_DestPort>: <ICMP> <Cannot Reach a Port> // In a node whose IP address has a subnet prefix of 202.14.236.0/24, each port does not have an open UDP service;

<UDP_Protocol> <Any_SourceIP> <Any_SourcePort> <UDP_SYN=1>→<202.14.237.1/32> <UDP_Port=1:52, 54:65535>:<ICMP> <Cannot Reach a Port> // In a node whose IP address has a subnet prefix of 202.14.236.1, a port with a port number ranging from 1025 to 65535 does not have an open UDP service; or <UDP_Protocol> <Any_SourceIP> <Any_SourcePort> <UDP_SYN=1>→<202.14.237.2/32> <Any_DestPort>: <ICMP> <Cannot Reach a Port>// In a node whose IP address is 202.14.237.2, each port does not have an open UDP service.

For example, the first packet is a UDP packet whose destination IP address is 202.14.237.1 and whose destination port number is 53. If the network security device determines that the UDP packet meets "<UDP_Protocol> <Any_SourceIP> <Any_SourcePort> <UDP_SYN=1>→<202.14.237.1/32> <UDP Port=53>", the network security device does not answer the UDP packet based on "<UDP_Protocol> <Any_SourceIP> <Any_SourcePort> <UDP_SYN=1>→<202.14.237.1/32> <UDP_Port=53>:<Skip answering>" in the fake network policy 5, so that the external device believes that, in a node whose IP address is 202.14.237.1, a port with a port number of 53 has an open UDP service.

For example, the first packet is a UDP packet whose destination IP address is 202.14.237.2 and whose destination port number is 2566. If the network security device determines that the UDP packet meets "<UDP_Protocol> <Any_SourceIP> <Any_SourcePort> <UDP_SYN=1>→<202.14.237.2/32> <Any_DestPort>", the network security device constructs an ICMP packet used to indicate that, in a node whose IP address is 202.14.237.2, a port with a port number of 2566 is unreachable, and sends the ICMP packet to the external device based on "<UDP_Protocol> <Any_SourceIP> <Any_SourcePort> <UDP_SYN=1>→<202.14.237.2/32> <Any DestPort>: <ICMP> <Cannot Reach a Port>" in the fake network policy 6, so that the external device believes that a port whose destination IP address is 202.14.237.2 and whose port number is 2566 does not have an open UDP service.

In this way, after performing UDP port scanning for many times, the attacker may consider that, in a node whose IP address in the fake network is 202.14.236.1, a port with a port number ranging from 1 to 1024 has an open UDP service, and another port in the fake network does not have a service.

For example, the third port is a port with a port number ranging from 1 to 1024 in all nodes whose IP addresses have a subnet prefix of 202.14.236.0/24 in the fake network, and the fourth port is any port in a node whose destination IP address has a subnet prefix of 202.14.235.0/24in the fake network, or any port in a node whose destination IP address has a subnet prefix of 202.14.237.0/24, or a port with a port number ranging from 1025 to 65535 in a node whose destination IP address has a subnet prefix of 202.14.236.0/ 24, the fake network policy 5 may be that: a matching condition is: a protocol type is the UDP, and a subnet prefix of a destination IP address is 202.14.236.0/24, and a destination port number is included in {1, 2, 3, . . . , 1023, 1024}; and the action in the fake network policy is: skipping answering. The network security device may implement the fake network policy by using the following code. In the following code, code before ":" is a matching condition, and code after ":" is an action in the fake network policy:

<UDP_Protocol> <Any_SourceIP> <Any_SourcePort> <UDP_SYN=1>→<202.14.236.0/24> <UDP_Port=1: 1024>:<Skip answering> // In a node whose IP address has a subnet prefix of 202.14.236.0/24, a port with a port number ranging from 1 to 1024 has an open UDP service.

The fake network policy 6 may be that: the matching condition is: a protocol type is the UDP, and a subnet prefix of a destination IP address is 202.14.235.0/24, or the matching condition is: a protocol type is the UDP, a subnet prefix of a destination IP address is 202.14.237.0/24, or the matching condition is: a protocol type is the UDP, a subnet prefix of a destination IP address is 202.14.236.0/24, and a destination port number is included in {1025, 1026, 1025, . . . , 65534, 65535}; and an action in the fake network policy is: constructing and sending a response packet, where the response packet is used to indicate that, in a destination device, a port corresponding to the destination port number is in an unopened state, and an IP address of the destination device is the same as the destination IP address. The network security device may implement the fake network policy by using the following code. In the following code, code before ":" is a matching condition, and code after ":" is an action in the fake network policy:

<UDP_Protocol> <Any_SourceIP> <Any_SourcePort> <UDP_SYN=1>→<202.14.235.0/24> <Any_DestPort>: <ICMP> <Cannot Reach a Port> // In a node whose IP address has a subnet prefix of 202.14.235.0/24, a port does not have an open UDP service;

<UDP_Protocol> <Any_SourceIP> <Any_SourcePort> <UDP_SYN=1>→<202.14.237.0/24> <Any_DestPort>: <ICMP> <Cannot Reach a Port> // In a node whose IP address has a subnet prefix of 202.14.237.0/24, a port does not have an open UDP service; or <UDP_Protocol> <Any_SourceIP> <Any_SourcePort><UDP_SYN=1>→<202.14.236.0/24> <UDP Port=1025:65535>:<ICMP> <Cannot Reach a Port> // In a node whose IP address has a subnet prefix of 202.14.236.0/24, a port with a port number ranging from 1025 to 65535 does not have an open UDP service.

For example, the first packet is a UDP packet whose destination IP address is 202.14.236.2 and whose destination port number is 566. If the network security device determines that the UDP packet meets "<UDP_Protocol> <Any_SourceIP> <Any_SourcePort> <UDP_SYN=1>→<202.14.236.0/24> <Any DestPort>", the network security device does not respond to the UDP packet based on "<UDP_Protocol> <Any_SourceIP> <Any_SourcePort> <UDP_SYN=1>→<202.14.236.0/24> <UDP_Port=1:1024>:<Skip answering" in the fake network policy 5, so that the external device believes that a port whose destination IP address is 202.14.236.2 and whose port number is 566 does not have an open UDP service.

For example, the first packet is a UDP packet whose destination IP address is 202.14.237.2 and whose destination port number is 2566. If the network security device determines that the UDP packet meets "<UDP_Protocol> <Any_SourceIP> <Any_SourcePort> <UDP_SYN=1>→<202.14.237.0/24> <Any_DestPort>", the network security device constructs an ICMP packet used to indicate that, in a node whose IP address is 202.14.237.2, a port with a port number of 2566 is unreachable, and sends the ICMP packet to the external device based on "<UDP_Protocol> <Any_SourceIP> <Any_SourcePort> <UDP_SYN=1>→<202.14.237.0/24> <Any_DestPort>: <ICMP> <Cannot Reach a Port>" in the fake network policy 6, so that the external device believes that a port whose destination IP address is 202.14.237.2 and whose port number is 2566 does not have an open UDP service. Therefore, after performing UDP port scanning for many times, the attacker may consider that, in all nodes corresponding to IPs having a subnet prefix of 202.14.236.0/24 in the fake network, a port with a port number ranging from 1 to 1024 has an open UDP service, and another port in the fake network does not have an open UDP service.

Figure 7:
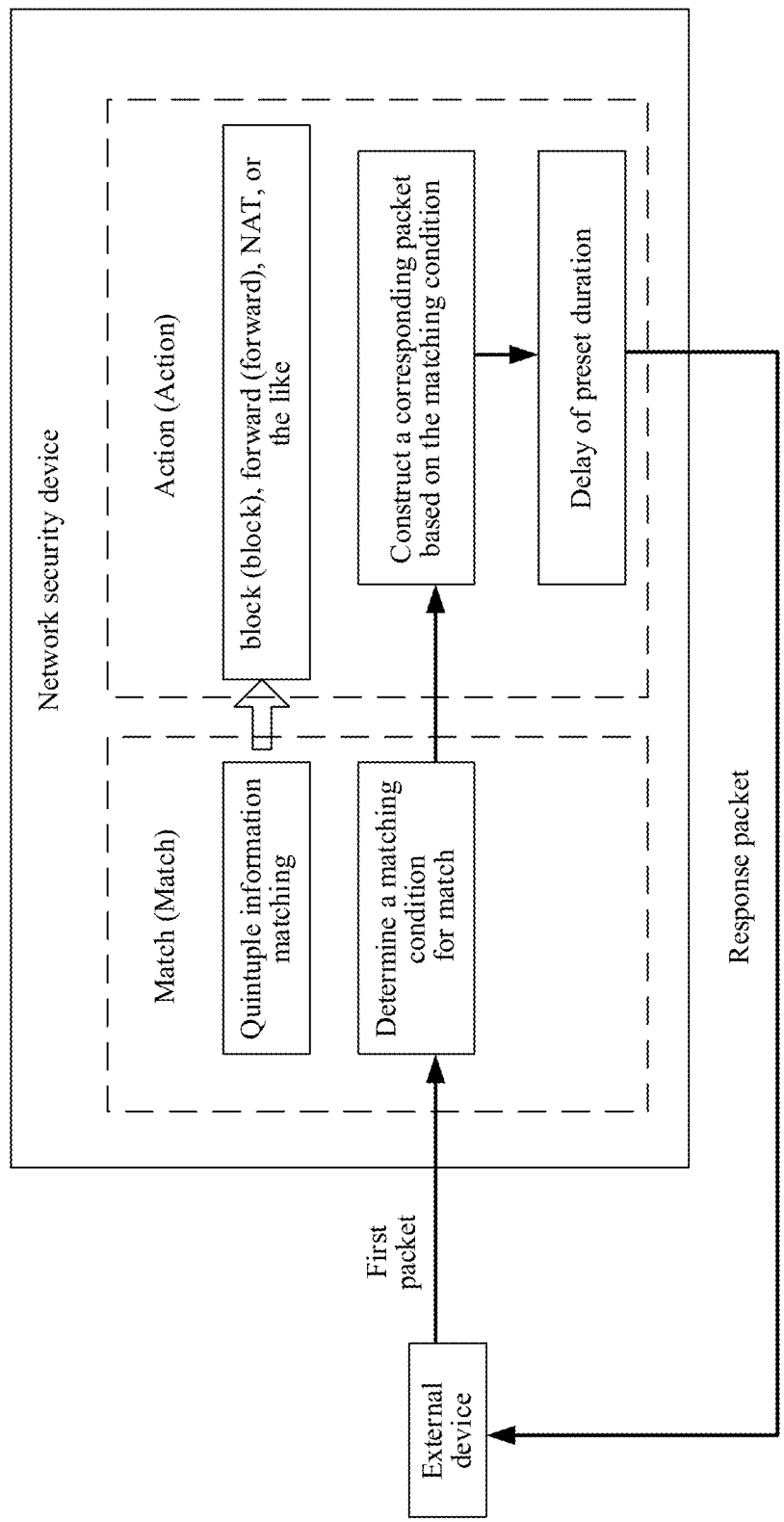
FIG. 7 is a flowchart of a method for delaying sending a response packet according to this application.

In the network scanning process launched by the attacker, after constructing the response packet based on the fake network policy, a network security device may alternatively send the response packet after a delay of preset duration, as shown in FIG. 7, thereby delaying time for establishing each session. In a delay process, the attacker needs to maintain a state of waiting for a reply, which may consume a large quantity of resources of the attacker, thereby reducing a speed of network scanning performed by the attacker. Assuming that normally, a network device takes two seconds to respond to a TCP packet, then it takes the attacker about eight minutes to scan TCP ports of 254 network devices. However, in the embodiments of this application, after constructing the response packet, the network security device sends the response packet after the delay of preset duration. If the preset duration is 20 seconds, then it takes the attacker about 85 minutes to scan the TCP ports of the 254 network devices, thereby greatly reducing a scanning speed of the attacker.

A network security device may specify a delayed time in a fake network policy. For example, the fake network policy 3 in which the first port is a port with a port number ranging from 1 to 1024 in all nodes whose IP addresses have a subnet prefix of 202.14.236.0/24 in the fake network, and a preset time is 40 seconds, the delayed time specified in the fake network policy 3 may be implemented by using the following code. In the following code, code before ":" is a matching condition, and code after ":" is an action in the fake network policy:

<TCP_Protocol><Any_SourceIP><Any_SourcePort> <TCP_SYN=1>→<202.14.236.0/24><TCP_Port=1:1024>: <TCP><TCP_SYN ACK><Delay=40> // An SYN ACK packet is delayed for 40 seconds before the packet is sent.

By using the method of delaying sending of a response packet, when the attacker performs TCP port scanning on a port in a node in the fake network, a TCP packet sent by the attacker may be answered after a delay of 40 seconds, and the attacker needs to maintain a state of waiting for an answer of the TCP packet in this period, so that resources of the attacker may be greatly consumed, and the attacker is forced to reduce scanning and attack speeds and slow down spread of the attack.

When the network security device receives a packet sent to the fake network, regardless of whether a behavior includes a known attack feature, the behavior is a highly suspicious behavior. Therefore, the network security device may further redirect the packet sent to the fake network to the honeypot device for analysis. When the network security device redirects the packet sent to the fake network to the honeypot device, the network security device may redirect all packets sent to the fake network to the honeypot device, or may redirect some packets sent to the fake network to the honeypot device. This is not limited in the embodiments of this application.

Figure 8:
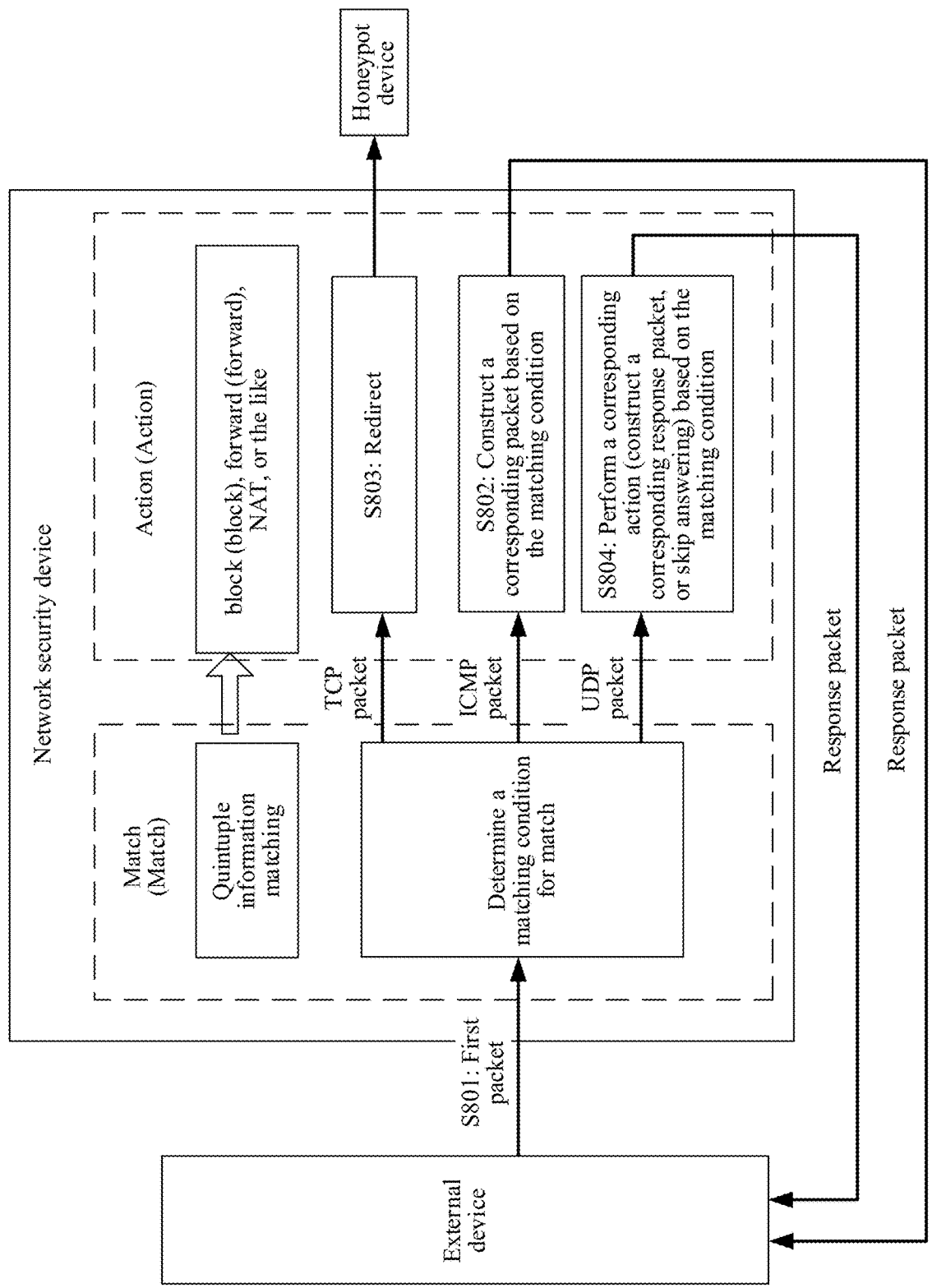
FIG. 8 is a flowchart of a method for defending against a network attack according to this application.

The process of processing the first packet by the network security device based on the fake network policy is specifically described below by using an example in which the network security device redirects a TCP packet sent to the fake network to a honeypot. As shown in FIG. 8:

S801. The network security device receives a first packet. If the first packet is an ICMP packet, perform step S802.

S802. The network security device constructs a response packet based on the fake network policy 1 or the fake network policy 2.

If the first packet is a TCP packet, perform step S803.

S803. The network security device redirects the first packet to a honeypot device. The network security device may redirect the first packet to the honeypot device by using the following code. In the following code, code before ":" is a matching condition, and code after ":" is a corresponding action:

<TCP_Protocol> <Any_SourceIP> <Any_SourcePort>→<202.14.235.0/24> <Any_DestPort>:<Redirect> <IP Address of a Honeypot> // A TCP packet whose destination IP address has a subnet prefix of 202.14.235.0/24 is redirected to the honeypot device;

<TCP_Protocol> <Any_SourceIP> <Any_SourcePort>→<202.14.236.0/24> <Any_DestPort>:<Redirect> <IP Address of a Honeypot> // A TCP packet whose destination IP address has a subnet prefix of 202.14.236.0/24 is redirected to the honeypot device; or <TCP Protocol> <Any_SourceIP> <Any_SourcePort>→<202.14.237.0/24> <Any_DestPort>:<Redirect> <IP Address of a Honeypot> // A TCP packet whose destination IP address has a subnet prefix of 202.14.237.0/24 is redirected to the honeypot device.

If the first packet is a UDP packet, perform step S804.

S804. The network security device constructs a response packet based on the fake network policy 5 or the fake network policy 6.

Figure 9:
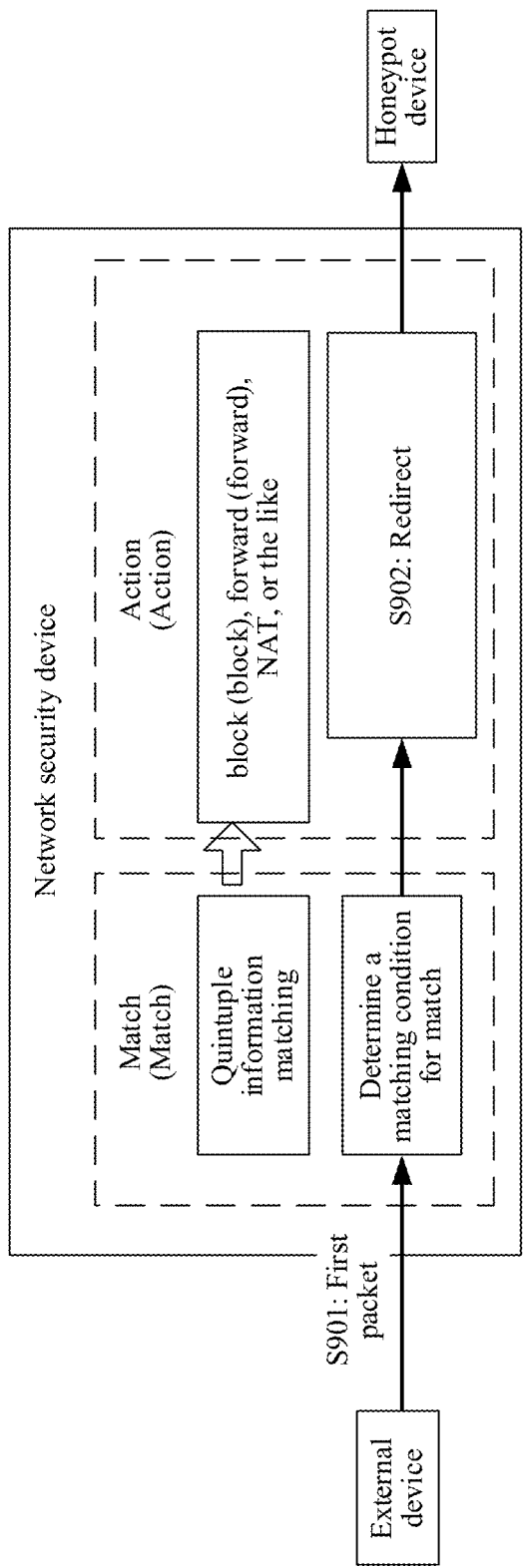
FIG. 9 is a flowchart of a method for defending against a network attack according to this application.

The process of processing the first packet by the network security device based on the fake network policy is specifically described below by using an example in which the network security device redirects all packets sent to the fake network to a honeypot. As shown in FIG. 9:

S901. The network security device receives a first packet.

S902. The network security device redirects the first packet to a honeypot device.

The network security device may redirect the first packet to the honeypot device by using the following code. In the following code, code before ":" is a matching condition, and code after ":" is a corresponding action:

<Any_Protocol> <Any_SourceIP> <Any_SourcePort>→<202.14.235.0/24> <Any_DestPort>:<Redirect> <IP Address of a Honeypot> // A packet whose destination IP address has a subnet prefix of 202.14.235.0/24 is redirected to the honeypot device;

<Any_Protocol> <Any_SourceIP> <Any_SourcePort>→<202.14.236.0/24> <Any_DestPort>:<Redirect> <IP Address of a Honeypot> // A packet whose destination IP address has a subnet prefix of 202.14.236.0/24 is redirected to the honeypot device; or <Any_Protocol> <Any_SourceIP> <Any_SourcePort>→<202.14.237.0/24> <Any_DestPort>:<Redirect> <IP Address of a Honeypot> // A packet whose destination IP address has a subnet prefix of 202.14.237.0/24 is redirected to the honeypot device.

When redirecting the first packet to the honeypot device, the network security device may use a port forwarding technology. To be specific, the network security device maps a port in each node in a fake network to a port in the honeypot device, and then when receiving a TCP packet sent to the fake network, the network security device forwards the TCP packet to the honeypot device.

Alternatively, the network security device may redirect the first packet to the honeypot device by using a tunneling technology. To be specific, a network tunnel between the network security device and the honeypot device is established. The network security device directly encapsulates the first packet into the network tunnel, and forwards the first packet to the honeypot device. The honeypot device may obtain the first packet through the tunnel and process the first packet. After processing, the honeypot device returns a network packet that needs to be returned to the network security device through the tunnel, and then the network security device sends the network packet to the external device or the protected network.

Alternatively, the network security device may redirect the first packet to the honeypot device by using another technology. This is not limited in the embodiments of this application.

By redirecting a highly suspicious packet to the honeypot device for analysis, security of the protected network can be improved. Compared with the prior art in which the honeypot device processes a large quantity of packets, in the embodiments of this application, the highly suspicious packet is submitted to the honeypot device for analysis, and a device such as a honeypot can be released from processing a large amount of normal traffic, thereby improving utilization of the device such as a honeypot, and further reducing costs of a network security defense.

After performing network scanning, based on some feature fields that may expose a system type and that are of a received response packet in a network scanning process, the attacker determines a system type of a node, and launches a network attack to a vulnerability of the system type. In the IP, the TCP, and the UDP protocol, feature fields that may expose a system type include: an IP grouping field: the field includes an IP ID identifier and the like, and IP IDs in IP packets sent by systems of different types are different; a TCP grouping field: the field includes an initial sequence number (ISN), a TCP initial window size (initial window size), types and magnitudes in TCP options (TCP options), and orders of the types and magnitudes in a group, and the initial sequence numbers (ISN), the TCP initial window sizes (initial window size), the types and magnitudes in TCP options (TCP options), and the orders of the types and magnitudes in a group are different; and a UDP grouping field: when receiving a UDP service request packet for a nonexistent UDP service port, a network device may answer with an ICMP error control packet, that is, a port unreachable packet, which is one of "ICMP destination unreachable" packets, and different types of systems have different implementation on an "ICMP message reference" part, that is, related fields regarding the "ICMP message reference" implemented by different types of systems are different.

Some system type identification methods commonly used by the attacker are described below. Specific fields in the TCP/IP protocol used in these methods are feature fields that can expose a system type.

In one method, based on a regulation of the TCP transmission control protocol RFC793, after receiving a TCP FIN packet, a node does not respond to the packet. However, a node of a system type such as MS Windows, BSDI, CISCO, HP/UX, MVS, or IRIX, may send back a RESET response packet after receiving the TCP FIN packet. Therefore, the attacker may identify a system type by using this feature.

In another method, when a node has a system type such as Solaris, IRIX, FreeBSD, Digital UNIX or Cray of a new version, responds to a TCP SYN packet, a selected initial sequence number (ISN) is a random increment; when a node has a system type of an old version responds to a TCP SYN packet, a selected ISN is 64K; and when a node has a system type of Linux 2.0.x, OpenVMS, new AIX, or the like, responds to a TCP SYN packet, a selected ISN is a true random number; or when a node has a system type of Windows responds to a TCP SYN packet, a selected ISN is determined by a time-correlated module, and after a period of time, the ISN is added by a fixed number, and the like. Therefore, the attacker can identify a system type based on an ISN selected by a node in response to a TCP connection request.

In another method, a size of a TCP window of a TCP packet sent by a node whose system type is AIX is 0x3F25, and a size of a TCP window of a TCP packet sent by a node whose system type is Windows2000, OpenBSD or FreeBSD is 0x402E. Therefore, the attacker may identify a system type by using this feature.

In another method, when a closed TCP port in a node of most system types receives a packet in which a FIN|PSH|URG sign is set, the closed TCP port may set ACK of a returned packet to a received initial sequence number, and a node whose system type is Windows and some network printer devices may add 1 to the ACK. When an open TCP port in a node whose system is Windows receives a packet in which an FIN|PSH|URG sign is set, the open TCP port may return a sequence number at some times, or add 1 to the sequence number, or even send back a random number. Therefore, the attacker may identify a system type by using this feature.

In addition to the foregoing several methods, the attacker may alternatively identify a system type based on ICMP error information, an ICMP message reference, an ICMP error message response integrity, a service type, IP fragment reorganization, a TCP option, an SYN Flood limit, and the like, or may identify a system type based on an IP total length, an IP ID field, IP header check, UDP header check, a priority field, a DF bit response, an IP ID field, an IP TTL field, a TOS field, and the like.

In this way, a network security device may further adjust a packet format of an outgoing packet sent to the external device, so that the external device can determine an incorrect system type based on a feature field that is in a received packet and that can expose a system type. The outgoing packet may be a response packet of a first packet constructed by the network security device based on a firewall policy, or the outgoing packet may be a packet forwarded by an internal device in a protected network by using the network security device.

Specifically, the network security device may adjust, based on a masquerading policy, a packet format of the outgoing packet based on a masquerading template, but does not modify load of a response packet. The masquerading policy includes a matching condition and the action corresponding to the matching condition, that is, a packet format of an outgoing packet is adjusted based on a masquerading template. The masquerading template defines at least one protocol field that needs to be rewritten. After the protocol field is rewritten, there is no impact on load of the packet, but a fake system type of the packet is exposed. Therefore, when the attacker fails to determine a system type of an internal device based on a received packet, the attacker obtains an incorrect conclusion, and fails to obtain a vulnerability of the internal device. The protocol field that needs to be rewritten is a feature field that may expose a system type, such as ICMP error information, an ICMP message reference, an ICMP error message response integrity, a service type, IP fragment reorganization, a TCP option, an SYN Flood limit, or the like.

The matching condition in the masquerading policy can be set based on a requirement. For example, the matching condition may be that a source IP address is any IP address in the protected network, and a source port number is any port number; or the matching condition may be that a protocol type is the TCP, a source IP address is any IP address in the protected network, and a source port number is 80; or the matching condition may also others. This is not specifically limited in the embodiment of this application.

Figure 10:
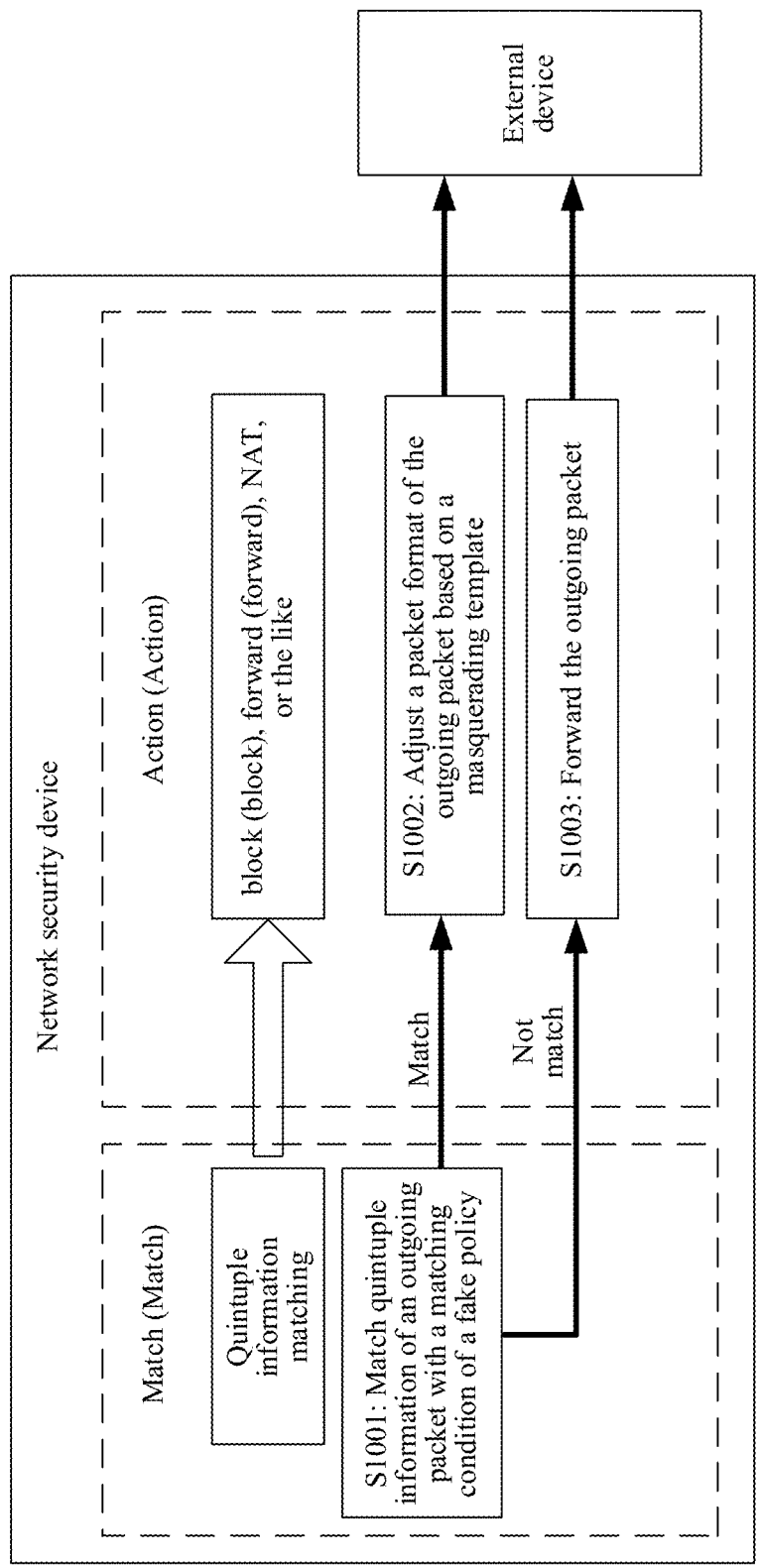
FIG. 10 is a flowchart of a method for processing an outgoing packet according to this application.

A process of processing an outgoing packet by the network security device is specifically shown in FIG. 10:

S1001. The network security device matches quintuple information of an outgoing packet with a matching condition in a masquerading policy.

If the quintuple information of the outgoing packet matches the matching condition in the masquerading policy, step S1002 is performed.

S1002. The network security device adjusts a packet format of the outgoing packet based on a masquerading template, and forwards an adjusted outgoing packet.

If the quintuple information of the outgoing packet does not match the matching condition in the masquerading policy, step S1003 is performed.

S1003. The network security device forwards the outgoing packet.

For example, the matching condition in the masquerading policy is that a source port number is 80, and a protocol type is the TCP. The network security device may implement the masquerading policy by using the following code. In the following code, code before ":" is a matching condition, and code after ":" is an action in the masquerading policy:

<TCP_Protocol>      <Any_SourceIP> <TCP_Port=80>→<Any_DestIP> <Any_DestPort>:<Masquerade a Packet> <Masquerading Template> // For an outgoing packet whose source port number is 80 and whose protocol type is the TCP, a description in the masquerading template is used to rewrite a protocol field of the outgoing packet.

The masquerading template may be a packet format corresponding to a specific system type.

By using the masquerading policy method, an attacker or a common user receives a network packet obtained by masquerading a system type. Because packet load is unchanged, the common user is not affected, but the attacker cannot identify a system type of an internal device in a protected network by using a protocol field in a received network packet.

Figure 11:
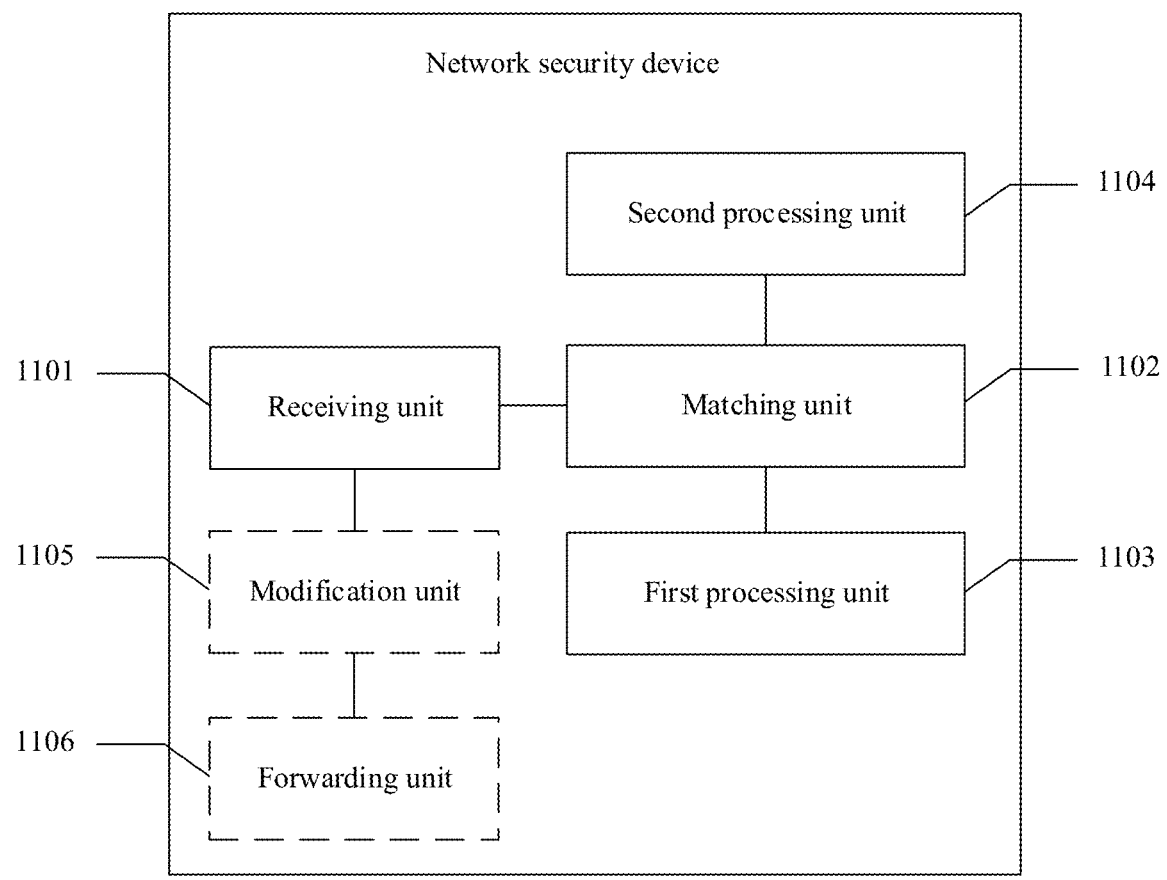
FIG. 11 is a schematic structural diagram of a network security device according to this application.

Based on an inventive concept the same as that of the method embodiments, this application further provides a network security device. As shown in FIG. 11, the network security device is deployed between a protected network and an external network in which an external device is located, and the network security device stores configuration information of a fake network, the configuration information includes an internet protocol IP address of each node in the fake network, and the network security device includes a receiving unit 1101, a matching unit 1102, a first processing unit 1103, and a second processing unit 1104. The receiving unit 1101 is configured to receive a first packet sent by the external device. The matching unit 1102 is configured to match a destination IP address of the first packet received by the receiving unit 1101 with the configuration information of the fake network. When an IP address of a node in the configuration information of the fake network has a same subnet prefix as the destination IP address, the first processing unit 1103 is configured to process the first packet based on a fake network policy, where each fake network policy includes a matching condition and an action corresponding to the matching condition, and the action includes constructing and sending a response packet, or prohibiting answering the first packet, or redirecting the first packet to a honeypot device. When no IP address of a node in the configuration information of the fake network has a same subnet prefix as the destination IP address, the second processing unit 1104 is configured to process the first packet based on a firewall policy.

Optionally, the first processing unit 1103 is specifically configured to: determine matching information of the first packet, separately match the matching information of the first packet with a matching condition included in at least one fake network policy, select a fake network policy matching the first packet, and perform an action in the selected fake network policy. The matching information includes at least one of the following: a protocol type of the first packet, a destination IP address of the first packet, and a destination port number of the first packet. The matching information of the first packet meets a matching condition in the selected fake network policy.

In a possible implementation, the matching condition in the selected fake network policy is: a protocol type is the internet control message protocol ICMP, and a destination IP address is an IP address of a first node in the fake network; and the action in the selected fake network policy is: constructing and sending a response packet, or redirecting the first packet to the honeypot device, where the response packet is used to indicate that the destination IP address is reachable. The configuration information may further include a topological relationship between nodes in the fake network, and the response packet may further carry a time to live, where the time to live is determined by the network security device based on the topological relationship, and the time to live indicates a quantity of routing nodes through which a packet passes in a process of transmitting the packet to the first node.

In another possible implementation, the matching condition in the selected fake network policy is: a protocol type is the ICMP, and a destination IP address is not an IP address of any node in the fake network; and the action in the selected fake network policy is: constructing and sending a response packet, or redirecting the first packet to the honeypot device, where the response packet is used to indicate that the destination IP address is unreachable, or an IP address of a gateway device corresponding to a subnet prefix of the destination IP address is reachable. The configuration information may further include a topological relationship between nodes in the fake network, and the response packet may further carry a time to live, where the time to live is determined by the network security device based on the topological relationship, and the time to live indicates a quantity of routing nodes through which a packet passes in a process of transmitting the packet to the gateway device corresponding to the subnet prefix of the destination IP address.

In another possible implementation, the matching condition in the selected fake network policy is: a protocol type is the transmission control protocol TCP, and a destination port number is a port number in a first set, where the first set includes at least one port number; and the action in the selected fake network policy is: constructing and sending a response packet, or redirecting the first packet to the honeypot device, where the response packet is used to indicate that, in a destination device, a port corresponding to the destination port number is in an open state, and an IP address of the destination device is the same as the destination IP address.

In another possible implementation, the matching condition in the selected fake network policy is: a protocol type is the TCP, and a destination port number is not a port number in a first set, where the first set includes at least one port number; and the action in the selected fake network policy is: constructing and sending a response packet, or redirecting the first packet to the honeypot device, where the response packet is used to indicate that, in a destination device, a port corresponding to the destination port number is in an unopened state, and an IP address of the destination device is the same as the destination IP address.

In another possible implementation, the matching condition in the selected fake network policy is: a protocol type is the user datagram protocol UDP, a destination IP address is an IP address of a second node in the fake network, the destination port number is not a port number included in a second set, and the second set includes at least one port number; and the action in the selected fake network policy is: constructing and sending a response packet, or redirecting the first packet to the honeypot device, where the response packet is used to indicate that, in the second node, a port corresponding to the destination port number is unreachable.

In another possible implementation, the matching condition in the selected fake network policy is: a protocol type is the UDP, and a destination IP address is an IP address of a third node in the fake network, and a destination port number is a port number included in a second set, where the second set includes at least one port number; and the action in the selected fake network policy is: prohibiting answering the first packet, or redirecting the first packet to the honeypot device.

When constructing and sending a response packet, the first processing unit 1103 may be specifically configured to construct a response packet, and send the response packet after a delay of preset duration.

In another possible implementation, the matching condition in the selected fake network policy is: a destination IP address is an IP address of a fourth node in the fake network; and the action in the selected fake network policy is: redirecting the first packet to the honeypot device.

Optionally, the second processing unit 1104 is specifically configured to construct a response packet in a first packet format based on the firewall policy, and send the response packet in the first packet format to the external device. The first packet format is a packet format corresponding to a first system type. The first system type is inconsistent with a second system type corresponding to a first internal device. The first internal device is located in the protected network, and an IP address of the first internal device is the same as the destination IP address.

The receiving unit 1101 may further be configured to receive a second packet sent by a second internal device, where the second internal device is any device in the protected network. The network security device may further include a modification unit 1105 and a forwarding unit 1106. The modification unit 1105 is configured to modify a packet format of the second packet received by the receiving unit 1101 into a second packet format, where a third system type corresponding to the second packet format is inconsistent with a fourth system type corresponding to the second internal device. The forwarding unit 1106 is configured to forward the second packet of the second packet format after modifying by the modification unit 1105.

Division of the modules in the embodiments of this application is an example, and is merely logical function division. There may be another division manner during actual implementation. In addition, the functional modules in the embodiments of this application may be integrated into one processor, or each of the functional modules may exist alone physically, or two or more modules may be integrated into one module. The integrated module may be implemented in a form of hardware, or may be implemented in a form of a software functional module.

Figure 12:
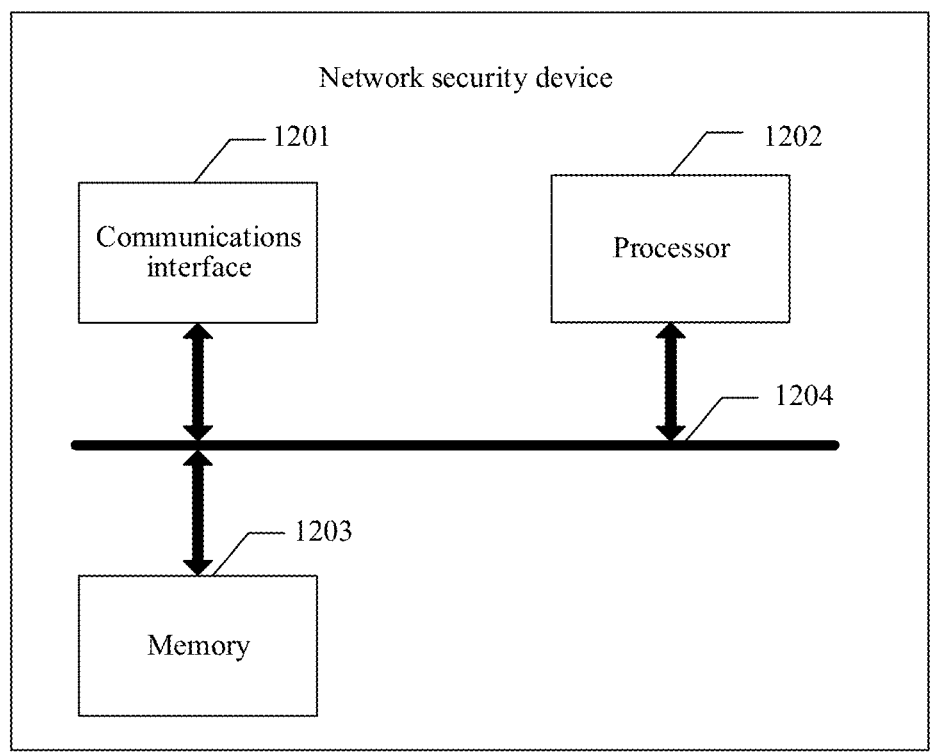
FIG. 12 is a schematic structural diagram of a network security device according to this application.

When the integrated module may be implemented in a form of hardware, as shown in FIG. 12, a network security device may include a processor 1202. Physical hardware corresponding to the foregoing modules may be the processor 1202. The processor 1202 may be a central processing unit (CPU), a digital processing module, or the like. The network security device may further include a communications interface 1201, and the processor 1202 receives and sends a packet through the communications interface 1201. The apparatus further includes: a memory 1203, configured to store a program performed by the processor 1202. The memory 1203 may be a nonvolatile memory, for example, a hard disk drive (HDD), or a solid-state drive (SSD), or a volatile memory, for example, a random-access memory (RAM). The memory 1203 is any other medium that can carry or store expected program code in a form of an instruction or a data structure and can be accessed by a computer, but is not limited thereto.

The processor 1202 is configured to perform the program code stored in the memory 1203, and is specifically configured to perform the methods in the embodiments shown in FIG. 3 to FIG. 10. This application is not described herein again.

A specific connection medium between the communications interface 1201, the processor 1202, and the memory 1203 is not limited in this embodiment of this application. According to this embodiment of this application, in FIG. 12, the memory 1203, the processor 1202, and the communications interface 1201 are connected to each other by using a bus 1204. The bus is represented by using a bold line in FIG. 12. A manner of connection between other components is only schematically described, but is not used as a limitation. The bus may be classified into an address bus, a data bus, a control bus, and the like. For ease of representation, only one thick line is used to represent the bus in FIG. 12, but this does not mean that there is only one bus or only one type of bus.

An embodiment of this application further provides a computer-readable storage medium. The computer-readable storage medium is configured to store a computer software instruction that needs to be executed by the foregoing processor, where the computer software instruction includes a program that needs to be executed by the foregoing processor.

An embodiment of this application provides a computer program product including an instruction. When the computer program product is run on a computer, the computer is enabled to perform the method for defending against a network attack in FIG. 3 and FIG. 10.

An embodiment of this application provides a chip system. The chip system includes a processor, configured to support a network security device in implementing a function in the method for defending against a network attack in FIG. 3 and FIG. 10. In a possible design, a chip system further includes a memory. The memory is configured to store a program instruction and data necessary for the network security device. A chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded into a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for defending against a network attack, comprising:

receiving, by a network security device, a first packet sent by an external device, wherein the network security device is deployed between a protected network and an external network in which the external device is located, the network security device stores configuration information of a fake network, and the configuration information comprises an internet protocol (IP) address of each node in the fake network;

matching, by the network security device, a destination IP address of the first packet with the configuration information of the fake network; and processing, by the network security device, the first packet based on a fake network policy when an IP address of a node in the configuration information of the fake network has a same subnet prefix as the destination IP address, wherein the fake network policy comprises a matching condition and an action corresponding to the matching condition, and the action comprises constructing and sending a response packet, or prohibiting answering the first packet, or redirecting the first packet to a honeypot device; and processing, by the network security device, the first packet based on a firewall policy when no IP address of any node in the configuration information of the fake network has the same subnet prefix as the destination IP address.

2. The method according to claim 1, wherein processing, by the network security device, the first packet based on the fake network policy comprises:

determining, by the network security device, matching information of the first packet, wherein the matching information comprises at least one of the following: a protocol type of the first packet, the destination IP address of the first packet, and a destination port number of the first packet;

separately matching, by the network security device, the matching information of the first packet with a matching condition comprised in at least one fake network policy, and selecting a fake network policy matching the first packet, wherein the matching information of the first packet meets a matching condition in the selected fake network policy; and performing, by the network security device, an action in the selected fake network policy.

3. The method according to claim 2, wherein the matching condition in the selected fake network policy is: the protocol type is an internet control message protocol (ICMP), and the destination IP address is an IP address of a first node in the fake network; and the action in the selected fake network policy is: constructing and sending a response packet, or redirecting the first packet to the honeypot device, wherein the response packet is used to indicate that the destination IP address is reachable.

4. The method according to claim 3, wherein the configuration information further comprises a topological relationship between nodes in the fake network, and the response packet carries a time to live, wherein the time to live is determined by the network security device based on the topological relationship, and the time to live indicates a quantity of routing nodes through which a packet passes in a process of transmitting the packet to the first node.

5. The method according to claim 2, wherein the matching condition in the selected fake network policy is: the protocol type is the ICMP, and the destination IP address is not an IP address of any node in the fake network; and the action in the selected fake network policy is: constructing and sending a response packet, or redirecting the first packet to the honeypot device, wherein the response packet is used to indicate that the destination IP address is unreachable, and an IP address of a gateway device corresponding to a subnet prefix of the destination IP address is reachable.

6. The method according to claim 5, wherein the configuration information further comprises a topological relationship between nodes in the fake network, and the response packet carries a time to live, wherein the time to live is determined by the network security device based on the topological relationship, and the time to live indicates a quantity of routing nodes through which a packet passes in a process of transmitting the packet to the gateway device corresponding to the subnet prefix of the destination IP address.

7. The method according to claim 2, wherein the matching condition in the selected fake network policy is: the protocol type is the transmission control protocol (TCP), and a destination port is a first port in the fake network, wherein the destination port is determined based on the destination IP address and the destination port number; and the action in the selected fake network policy is: constructing and sending a response packet, or redirecting the first packet to the honeypot device, wherein the response packet is used to indicate that the destination port is in an open state.

8. The method according to claim 2, wherein the matching condition in the selected fake network policy is: the protocol type is the TCP, and a destination port is not a first port in the fake network, wherein the destination port is determined based on the destination IP address and the destination port number; and the action in the selected fake network policy is: constructing and sending a response packet, or redirecting the first packet to the honeypot device, wherein the response packet is used to indicate that the destination port is in an unopened state.

9. The method according to claim 2, wherein the matching condition in the selected fake network policy is: a protocol type is a user datagram protocol (UDP), and a destination port is not a second port in the fake network, wherein the destination port is determined based on the destination IP address and the destination port number; and the action in the selected fake network policy is: constructing and sending a response packet, or redirecting the first packet to the honeypot device, wherein the response packet is used to indicate that the destination port is unreachable.

10. The method according to claim 2, wherein the matching condition in the selected fake network policy is: the protocol type is the UDP, and a destination port is a second port in the fake network, wherein the destination port is determined based on the destination IP address and the destination port number; and the action in the selected fake network policy is: prohibiting answering the first packet, or redirecting the first packet to the honeypot device.

11. The method according to claim 2, wherein the matching condition in the selected fake network policy is: a destination IP address is an IP address of a fourth node in the fake network; and the action in the selected fake network policy is: redirecting the first packet to the honeypot device.

12. The method according to claim 1, wherein that the network security device constructs and sends a response packet comprises:

constructing, by the network security device, the response packet, and sending the response packet after a delay of a preset duration.

13. The method according to claim 1, wherein processing, by the network security device, the first packet based on the firewall policy, comprises:

constructing, by the network security device, a response packet in a first packet format based on the firewall policy, wherein the first packet format is a packet format corresponding to a first system type, the first system type is inconsistent with a second system type corresponding to a first internal device, the first internal device is located in the protected network, and an IP address of the first internal device is the same as the destination IP address; and sending, by the network security device, the response packet in the first packet format to the external device.

14. The method according to claim 1, wherein the method further comprises:

receiving, by the network security device, a second packet sent by a second internal device, wherein the second internal device is any device in the protected network;

modifying, by the network security device, a packet format of the second packet into a second packet format, wherein a third system type corresponding to the second packet format is inconsistent with a fourth system type corresponding to the second internal device; and forwarding, by the network security device, the second packet in the second packet format.

15. A network security device, wherein the network security device is deployed between a protected network and an external network in which an external device is located, the network security device comprises:

a memory unit comprising instructions and configuration information of a fake network, the configuration information comprises an interne protocol M address of each node in the fake network;

a communications interface; and one or more hardware processors coupled to the processing unit, wherein the communications interface is configured to receive a first packet sent by the external device;

the one or more hardware processors execute the instructions to:

match a destination IP address of the first packet received by the communications interface receiving unit with the configuration information of the fake network;

process the first packet based on a fake network policy, when an IP address of a node in the configuration information of the fake network has a same subnet prefix as the destination IP address, wherein the fake network policy comprises a matching condition and an action corresponding to the matching condition, and the action comprises constructing and sending a response packet, or prohibiting answering the first packet, or redirecting the first packet to a honeypot device; and process the first packet based on a firewall policy, when no IP address of any node in the configuration information of the fake network has the same subnet prefix as the destination IP address.

16. The network security device according to claim 15, wherein the instructions when executed by the one or more hardware processors further cause the network security device:

determine matching information of the first packet, wherein the matching information comprises at least one of the following: a protocol type of the first packet, the destination IP address of the first packet, and a destination port number of the first packet;

separately match the matching information of the first packet with a matching condition comprised in at least one fake network policy, and select a fake network policy matching the first packet, wherein the matching information of the first packet meets a matching condition in the selected fake network policy; and perform an action in the selected fake network policy.

17. The network security device according to claim 16, wherein the matching condition in the selected fake network policy is: a protocol type is the internet control message protocol (ICMP), and a destination IP address is an IP address of a first node in the fake network; and the action in the selected fake network policy is: constructing and sending a response packet, or redirecting the first packet to the honeypot device, wherein the response packet is used to indicate that the destination IP address is reachable.

18. The network security device according to claim 17, wherein the configuration information further comprises a topological relationship between nodes in the fake network, and the response packet carries a time to live, wherein the time to live is determined by the network security device based on the topological relationship, and the time to live indicates a quantity of routing nodes through which a packet passes in a process of transmitting the packet to the first node.

19. The network security device according to claim 16, wherein the matching condition in the selected fake network policy is: a protocol type is the transmission control protocol (TCP), and a destination port is a first port in the fake network, wherein the destination port is determined based on the destination IP address and the destination port number; and the action in the selected fake network policy is: constructing and sending a response packet, or redirecting the first packet to the honeypot device, wherein the response packet is used to indicate that the destination port is in an open state.

20. A non-transitory computer-readable storage medium, wherein the computer-readable storage medium stores a computer executable instruction, and the computer executable instruction is used to enable a computer to:

receive a first packet sent by an external device, wherein the network security device is deployed between a protected network and an external network in which the external device is located, the network security device stores configuration information of a fake network, and the configuration information comprises an internet protocol (IP) address of each node in the fake network;

match a destination IP address of the first packet with the configuration information of the fake network; and process the first packet based on a fake network policy when an IP address of a node in the configuration information of the fake network has a same subnet prefix as the destination IP address, wherein the fake network policy comprises a matching condition and an action corresponding to the matching condition, and the action comprises constructing and sending a response packet, or prohibiting answering the first packet, or redirecting the first packet to a honeypot device; and process the first packet based on a firewall policy when no IP address of any node in the configuration information of the fake network has the same subnet prefix as the destination IP address.

\* \* \* \* \*

UNITED STATES PATENT AND TRADEMARK OFFICE
CERTIFICATE OF CORRECTION

PATENT NO. : 11,570,212 B2
APPLICATION NO. : 17/026202
DATED : January 31, 2023
INVENTOR(S) : Yuchen Wang It is certified that error appears in the above-identified patent and that said Letters Patent is hereby corrected as shown below:

In the Claims

In Column 34, Line 66, in Claim 15, delete "interne protocol M" and insert -- internet protocol (IP) --.

Signed and Sealed this
Eleventh Day of April, 2023

Katherine Kelly Vidal
*Director of the United States Patent and Trademark Office*